(12) United States Patent
Busbee

(10) Patent No.: US 11,701,813 B2
(45) Date of Patent: Jul. 18, 2023

(54) METHODS FOR THREE-DIMENSIONALLY PRINTING AND ASSOCIATED MULTI-INPUT PRINT HEADS AND SYSTEMS

(71) Applicant: Kornit Digital Technologies Ltd., Rosh HaAyin (IL)

(72) Inventor: Travis Alexander Busbee, Somerville, MA (US)

(73) Assignee: Kornit Digital Technologies Ltd., Rosh HaAyin (IL)

( * ) Notice: Subject to any disclaimer, the term of this patent is extended or adjusted under 35 U.S.C. 154(b) by 79 days.

(21) Appl. No.: 17/003,089

(22) Filed: Aug. 26, 2020

(65) Prior Publication Data

US 2021/0039306 A1    Feb. 11, 2021

Related U.S. Application Data

(63) Continuation-in-part of application No. 15/907,122, filed on Feb. 27, 2018, now abandoned.
(Continued)

(51) Int. Cl.
*B29C 64/112* (2017.01)
*B29C 64/245* (2017.01)
(Continued)

(52) U.S. Cl.
CPC .......... *B29C 64/112* (2017.08); *B29C 64/209* (2017.08); *B29C 64/227* (2017.08);
(Continued)

(58) Field of Classification Search
CPC ... B29C 64/112; B29C 64/314; B29C 64/245; B29C 64/209; B29C 64/227; B29C 64/336; B33Y 10/00; B33Y 70/00
See application file for complete search history.

(56) References Cited

U.S. PATENT DOCUMENTS

| 3,053,454 A | 9/1962 | Waterfill |
| 3,982,663 A | 9/1976 | Larkin |

(Continued)

FOREIGN PATENT DOCUMENTS

| CN | 1612785 | 5/2005 |
| CN | 101084186 | 12/2007 |

(Continued)

OTHER PUBLICATIONS

International Search Report and Written Opinion for International Application No. PCT/US2021/047745 dated Dec. 5, 2021.
(Continued)

*Primary Examiner* — Joseph S Del Sole
*Assistant Examiner* — John Robitaille

(57) ABSTRACT

The present invention generally relates to the printing of materials, using 3-dimensional printing and other printing techniques, including the use of one or more mixing nozzles, and/or multi-axis control over the translation and/or rotation of the print head or the substrate onto which materials are printed. In some embodiments, a material may be prepared by extruding material through print head comprising a nozzle, such as a microfluidic printing nozzle, which may be used to mix materials within the nozzle and direct the resulting product onto a substrate. The print head and/or the substrate may be configured to be translated and/or rotated, for example, using a computer or other controller, in order to control the deposition of material onto the substrate.

17 Claims, 13 Drawing Sheets

Related U.S. Application Data

(60) Provisional application No. 62/555,874, filed on Sep. 8, 2017, provisional application No. 62/555,886, filed on Sep. 8, 2017, provisional application No. 62/464,363, filed on Feb. 27, 2017.

(51) Int. Cl.
| | |
|---|---|
| *B29C 64/227* | (2017.01) |
| *B29C 64/314* | (2017.01) |
| *B29C 64/336* | (2017.01) |
| *B29C 64/209* | (2017.01) |
| *B33Y 10/00* | (2015.01) |
| *B33Y 40/10* | (2020.01) |
| *B33Y 70/00* | (2020.01) |
| *B29L 31/50* | (2006.01) |
| *B29K 75/00* | (2006.01) |
| *B29K 67/00* | (2006.01) |
| *B29K 77/00* | (2006.01) |
| *B29K 55/02* | (2006.01) |

(52) U.S. Cl.
CPC .......... *B29C 64/245* (2017.08); *B29C 64/314* (2017.08); *B29C 64/336* (2017.08); *B29K 2023/06* (2013.01); *B29K 2055/02* (2013.01); *B29K 2067/003* (2013.01); *B29K 2075/00* (2013.01); *B29K 2077/00* (2013.01); *B29L 2031/505* (2013.01); *B33Y 10/00* (2014.12); *B33Y 40/10* (2020.01); *B33Y 70/00* (2014.12)

(56) References Cited

U.S. PATENT DOCUMENTS

| | | |
|---|---|---|
| 4,078,576 A | 3/1978 | Punch et al. |
| 4,708,292 A | 11/1987 | Gammons |
| 5,335,992 A | 8/1994 | Holl |
| 5,385,953 A | 1/1995 | McClellan |
| 5,820,354 A | 10/1998 | Wild et al. |
| 5,979,787 A | 11/1999 | Scarpa |
| 6,165,406 A * | 12/2000 | Jang .................. G05B 19/4099 425/375 |
| 8,333,330 B2 | 12/2012 | Schuetze et al. |
| 8,758,263 B1 | 6/2014 | Rahimian et al. |
| 9,375,051 B2 | 6/2016 | Doremus et al. |
| 9,421,565 B2 | 8/2016 | Lewis et al. |
| 9,453,142 B2 | 9/2016 | Rolland et al. |
| 9,491,987 B2 | 11/2016 | Antonelli et al. |
| 10,076,876 B2 | 9/2018 | Mark et al. |
| 10,119,108 B2 | 11/2018 | Maggiore |
| 10,254,499 B1 | 4/2019 | Cohen et al. |
| 10,442,910 B2 | 10/2019 | Baghdadi et al. |
| 10,716,358 B2 | 7/2020 | Reinhardt et al. |
| 10,806,208 B2 | 10/2020 | Busgen et al. |
| 10,932,515 B2 | 3/2021 | Busbee |
| 2004/0126254 A1 | 7/2004 | Chen et al. |
| 2004/0187714 A1 | 9/2004 | Napadensky et al. |
| 2004/0253365 A1* | 12/2004 | Warren ................. B05C 5/0216 118/715 |
| 2006/0035034 A1 | 2/2006 | Matsumoto et al. |
| 2008/0026190 A1 | 1/2008 | King et al. |
| 2008/0132597 A1 | 6/2008 | Nozawa et al. |
| 2009/0143765 A1 | 6/2009 | Slocum et al. |
| 2010/0140852 A1 | 6/2010 | Kritchman et al. |
| 2011/0189785 A1 | 8/2011 | Gutmann et al. |
| 2011/0315291 A1 | 12/2011 | Abad et al. |
| 2013/0320598 A1 | 12/2013 | Atkins et al. |
| 2014/0020191 A1 | 1/2014 | Jones et al. |
| 2014/0020192 A1 | 1/2014 | Jones et al. |
| 2014/0027952 A1 | 1/2014 | Fan et al. |
| 2014/0137965 A1 | 5/2014 | Truitt et al. |
| 2014/0182170 A1 | 7/2014 | Wawrousek et al. |
| 2015/0142159 A1 | 5/2015 | Chang |
| 2015/0230562 A1 | 8/2015 | Jones et al. |
| 2015/0336298 A1 | 11/2015 | Dean |
| 2015/0352787 A1 | 12/2015 | Humbert et al. |
| 2016/0021969 A1 | 1/2016 | Lettow, II et al. |
| 2016/0107396 A1 | 4/2016 | Berman |
| 2016/0192741 A1 | 7/2016 | Mark |
| 2016/0205963 A1 | 7/2016 | Saal et al. |
| 2016/0219982 A1 | 8/2016 | Waatti |
| 2016/0235158 A1 | 8/2016 | DesJardins et al. |
| 2016/0299047 A1 | 10/2016 | Molla et al. |
| 2016/0374428 A1 | 12/2016 | Kormann et al. |
| 2016/0374431 A1 | 12/2016 | Tow |
| 2017/0050374 A1 | 2/2017 | Minardi et al. |
| 2017/0122322 A1 | 5/2017 | Zinniel et al. |
| 2017/0156444 A1* | 6/2017 | Guest .................... B29D 35/12 |
| 2017/0164899 A1 | 6/2017 | Yang et al. |
| 2017/0203406 A1 | 7/2017 | Ganapathiappan et al. |
| 2017/0238870 A1 | 8/2017 | Lee et al. |
| 2017/0251713 A1 | 9/2017 | Warner et al. |
| 2017/0265582 A1 | 9/2017 | Walker et al. |
| 2017/0319368 A1 | 11/2017 | Selner |
| 2018/0029291 A1 | 2/2018 | Matzner et al. |
| 2018/0133670 A1 | 5/2018 | Lewis et al. |
| 2018/0353308 A1 | 12/2018 | Tompkins |
| 2018/0369910 A1 | 12/2018 | Gunther et al. |
| 2019/0037960 A1 | 2/2019 | Busbee et al. |
| 2019/0037961 A1 | 2/2019 | Busbee et al. |
| 2019/0037969 A1 | 2/2019 | Busbee et al. |
| 2019/0039299 A1 | 2/2019 | Busbee et al. |
| 2019/0039309 A1 | 2/2019 | Busbee et al. |
| 2019/0039310 A1 | 2/2019 | Busbee et al. |
| 2019/0039311 A1 | 2/2019 | Busbee et al. |
| 2019/0246741 A1 | 8/2019 | Busbee et al. |
| 2019/0248089 A1 | 8/2019 | Busbee et al. |
| 2019/0283394 A1 | 9/2019 | Ashcroft et al. |
| 2019/0322884 A1 | 10/2019 | Bloomfield et al. |
| 2019/0387839 A1 | 12/2019 | Dua et al. |
| 2020/0181351 A1 | 6/2020 | Bailey et al. |
| 2021/0037908 A1 | 2/2021 | Busbee |
| 2021/0039306 A1 | 2/2021 | Busbee |
| 2021/0039399 A1 | 2/2021 | Busbee |
| 2021/0186151 A1 | 6/2021 | Gross |
| 2021/0321713 A1 | 10/2021 | Busbee |
| 2022/0000212 A1 | 1/2022 | Busbee |

FOREIGN PATENT DOCUMENTS

| | | |
|---|---|---|
| CN | 101995479 | 3/2011 |
| CN | 103126182 | 6/2013 |
| CN | 103909655 | 7/2014 |
| CN | 103909655 A | 7/2014 |
| CN | 104191616 | 12/2014 |
| CN | 104191616 A | 12/2014 |
| CN | 104786506 | 7/2015 |
| CN | 104786506 A | 7/2015 |
| CN | 104875389 | 9/2015 |
| CN | 104875389 A | 9/2015 |
| CN | 205058637 | 3/2016 |
| CN | 205058637 U | 3/2016 |
| CN | 105722663 | 6/2016 |
| CN | 205741716 | 11/2016 |
| CN | 205741716 U | 11/2016 |
| CN | 106331236 | 1/2017 |
| CN | 106331236 A | 1/2017 |
| DE | 102015016464 | 6/2017 |
| EP | 1882514 | 1/2008 |
| EP | 2594146 | 5/2013 |
| EP | 2955004 | 12/2015 |
| JP | 03-201809 | 9/1991 |
| JP | 3201809 | 1/2016 |
| JP | 2019-022986 | 2/2019 |
| WO | WO 03/041875 | 5/2003 |
| WO | WO 2012/109612 | 8/2012 |
| WO | WO 2015/112254 | 7/2015 |
| WO | WO 2015/200173 | 12/2015 |
| WO | WO 2016/164562 | 10/2016 |
| WO | WO 2016/191329 | 12/2016 |
| WO | WO 2016/191329 A1 | 12/2016 |
| WO | WO 2016/209872 | 12/2016 |
| WO | WO 2016/209872 A1 | 12/2016 |

(56) References Cited

FOREIGN PATENT DOCUMENTS

| WO | WO 2018/115874 | 6/2018 |
|---|---|---|
| WO | WO 2018/115874 A1 | 6/2018 |
| WO | WO 2018/157148 | 8/2018 |
| WO | WO 2022/047025 | 3/2022 |

OTHER PUBLICATIONS

International Search Report and Written Opinion for International Application No. PCT/US2021/047738 dated Dec. 9, 2021.
[No Author Listed], Amtel restructuring—again. Rubber News. Sep. 8, 2009. 4 pages.
Bauman, Surface-modified rubber particles for polyurethanes. Plastic Additives. Polymer Science and Technology Series. 1998;1:584-9.
Piszczyk et al., Polyurethane/ground tire rubber composite foams based on polyglycerol: Processing, mechanical and thermal properties. Journal of Reinforced Plastics and Composites. 2015;10 pages.
Sanjay, Effect of Crumb-Rubber Particle Size on Mechanical Response of Polyurethane Foam Composites. Oklahoma State University Masters Thesis. Jul. 2014. 55 pages.
Shan et al., Study of Flexible Polyurethane Foams Reinforced with Coir Fibres and Tyre Particles. International Journal of Applied Physics and Mathematics. 2012;2:123.
Subramaniyan et al., Mechanical Behavior of Polyurethane Composite Foams from Kenaf Fiber and Recycled Tire Rubber Particles. Applied Mechanics and Materials. 2013;315:861-6. Epub Apr. 10, 2013.
Final Official Action dated Dec. 2, 2021 From the US Patent and Trademark Office Re. U.S. Appl. No. 15/907,085. (7 Pages).
Final Official Action dated Mar. 7, 2022 from US Patent and Trademark Office Re. U.S. Appl. No. 15/907,128. (21 pages).
International Preliminary Report on Patentability dated Sep. 6, 2019 From the International Bureau of WIPO Re. Application No. PCT/US2018/020000. (12 Pages).
International Search Report and the Written Opinion dated Dec. 5, 2021 From the International Searching Authority Re. Application No. PCT/US2021/047745. (23 Pages).
International Search Report and the Written Opinion dated Jul. 6, 2018 From the International Searching Authority Re. Application No. PCT/IL2018/020000. (15 Pages).
International Search Report and the Written Opinion dated Jun. 8, 2018 From the International Searching Authority Re. Application No. PCT/US2018/019993. ( 15 Pages).
International Search Report and the Written Opiniond dated Dec. 9, 2021 From the International Searching Authority Re. Application No. PCT/US2021/047738. (9 Pages).
Notice of Allowance dated Feb. 11, 2022 From the US Patent and Trademark Office Re. U.S. Appl. No. 15/907,100. (6 Pages).
Notification of Office Action and Search Report dated Aug. 23, 2021 From the State Intellectual Property Office of the People's Republic of China Re. Application No. 201880027758.0 and Its Translation of Office Action Into English. (42 Pages).
Official Action dated Oct. 7, 2019 From the US Patent and Trademark Office Re. U.S. Appl. No. 15/907,100. (9 Pages).
Official Action dated Feb. 19, 2021 from US Patent and Trademark Office Re. U.S. Appl. No. 15/907,085. (9 pages).
Official Action dated Mar. 21, 2022 from US Patent and Trademark Office Re. U.S. Appl. No. 15/907,085. (8 pages).
Official Action dated Jul. 24, 2020 From the US Patent and Trademark Office Re. U.S. Appl. No. 15/907,100. (6 Pages).
Official Action dated Apr. 29, 2021 From the US Patent and Trademark Office Re. U.S. Appl. No. 15/907,100. (14 Pages).
Restriction Official Action dated May 29, 2020 From the US Patent and Trademark Office Re. U.S. Appl. No. 15/907,085. (7 Pages).
Supplementary European Search Report and the European Search Opinion dated Nov. 19, 2020 From the European Patent Office Re. Application No. 18758170.7. (13 Pages).
AirBoss "Amtel Restructuring—Again", Rubber & Plastics News: 4.P., Sep. 8, 2009.
Bauman "Surface-Modified Rubber Particles for Polyurethanes", Polymer Science and Technology Series book series (POLS, 1: 584-589, 1998.
Piszczyk et al. "Polvurethane/Ground Tire Rubber Composite Foams Based on Polyglycerol: Processing, Mechanical and Thermal Properties", Journal of Reinforced Plastics and Composites: 1-10, Apr. 2, 2015.
Sanjay "Effect of Crumb-Rubber Particle Size on Mechanical Response of Polyurethane Foam Composites", Oklahoma State University. ProQuest Dissertations Publishing, 1567387. 12P, 2014.
Shan et al. "Study of Flexible Polyurethane Foams Reinforced with Coir Fibres and Tyre Particles", International Journal of Applied Physics and Mathematics, 2(2): 123-130, Mar. 2012.
Subramaniyan et al. "Mechanical Behavior of Polyurethane Composite Foams from Kenaf Fiber and Recycled Tire Rubber Particles", Applied Mechanics and Materials, 315: 861-866, Apr. 2013.
U.S. Appl. No. 15/907,122, filed Feb. 27, 2018, Busbee et al.
U.S. Appl. No. 15/907,128, filed Feb. 27, 2018, Busbee et al.
U.S. Appl. No. 15/907,160, filed Feb. 27, 2018, Busbee et al.
U.S. Appl. No. 15/907,147, filed Feb. 27, 2018, Busbee et al.
U.S. Appl. No. 17/188,490, filed Mar. 1, 2021, Busbee.
U.S. Appl. No. 15/907,085, filed Feb. 27, 2018, Busbee et al.
U.S. Appl. No. 15/907,100, filed Feb. 27, 2018, Busbee et al.
U.S. Appl. No. 17/003,106, filed Aug. 26, 2020, Busbee.
U.S. Appl. No. 17/003,118, filed Aug. 26, 2020, Busbee.
U.S. Appl. No. 17/320,094, filed May 13, 2021, Busbee.
PCT/US2021/047745, Dec. 5, 2021, International Search Report and Written Opinion.
PCT/US2021/047738, Dec. 9, 2021, International Search Report and Written Opinion.
Notification of Office Action and Search Report dated Jul. 26, 2022 From the China National Intellectual Property Administration Re. Application No. 201880027758.0 and Its Translation Into English. (27 Pages).
Notice of Allowance dated Jul. 14, 2022 from US Patent and Trademark Office Re. U.S. Appl. No. 15/907,100. (17 pages).
Official Action dated Apr. 14, 2021 From the US Patent and Trademark Office Re. U.S. Appl. No. 15/907,122. (66 Pages).
Official Action Dated Nov. 26, 2021 From the US Patent and Trademark Office Re. U.S. Appl. No. 15/907,122. (66 Pages).
Restriction Official Action dated Oct. 2, 2020 From the US Patent and Trademark Office Re. U.S. Appl. No. 15/907,122. (7 Pages).
Official Action dated Feb. 23, 2021 From US Patent and Trademark Office Re. U.S. Appl. No. 15/907,128. (22 Pages).
Official Action dated Sep. 23, 2021 from US Patent and Trademark Office Re. U.S. Appl. No. 15/907,128. (20 pages).
Official Action dated Apr. 30, 2020 from US Patent and Trademark Office Re. U.S. Appl. No. 15/907,128. (16 Pages).
Restriction Official Action dated Feb. 14, 2020 From US Patent and Trademark Office Re. U.S. Appl. No. 15/907,128. (9 Pages).
International Preliminary Report on Patentability Mar. 9, 2023 From the International Bureau of WIPO Re. Application No. PCT US2021/047745. (10 Pages).

\* cited by examiner

1 - motor
2 - impellar
3 - particles
4 - nozzle
5 - carrier polymer
6 - filler material feed
7 - polymer carrier feed
8 - printed composite

METHODS FOR THREE-DIMENSIONALLY PRINTING AND ASSOCIATED MULTI-INPUT PRINT HEADS AND SYSTEMS

RELATED APPLICATIONS

This application is a continuation-in-part of U.S. application Ser. No. 15/907,122, filed Feb. 27, 2018, which claims the benefit of priority under 35 U.S.C. § 119(e) to U.S. Provisional Application No. 62/555,874, filed Sep. 8, 2017, U.S. Provisional Application No. 62/555,886, filed Sep. 8, 2017 and U.S. Provisional Application No. 62/464,363, filed Feb. 27, 2017, all of which are incorporated herein by reference in their entirety for all purposes.

FIELD

The present invention generally relates to the printing of articles (e.g., of footwear), using 3-dimensional printing and other printing techniques, including the use of one or more mixing nozzles, and/or multi-axis control over the translation and/or rotation of the print head or the substrate onto which the articles are printed.

BACKGROUND

Three-dimensional (3D) printing is a method of additive manufacturing in which material layers can be successively formed on a substrate in order to manufacture an object. A layer deposited by a method of 3D printing may have a thickness between, for example, 10 micrometers and 1 millimeter. A 3D printed layer may be deposited in a parallel or perpendicular orientation relative to that of the preceding layer. However, 3D printing can be limited by, for example, the type of materials that can be printed, or the breadth of material properties or color achievable in a single print, and thus, techniques for improved 3D printing are needed.

The manufacture of composites may involve the expensive and environmentally hazardous synthesis and incorporation of new materials. In addition, the properties of composites may be difficult to control. Improved methods of manufacture of composites are thus needed.

SUMMARY

The present invention generally relates to the printing of articles (e.g., of footwear), using 3-dimensional printing and other printing techniques, including the use of one or more mixing nozzles, and/or multi-axis control over the translation and/or rotation of the print head or the substrate onto which the articles are printed. The subject matter of the present invention involves, in some cases, interrelated products, alternative solutions to a particular problem, and/or a plurality of different uses of one or more systems and/or articles.

According one aspect, a microfluidic printing nozzle is provided. In some embodiments, the microfluidic printing nozzle comprises at least two material inlets in fluid communication with a mixing chamber. In some embodiments, the device comprises an impeller disposed in the mixing chamber. In some embodiments, at least two of the material inlets are each in fluid communication with a discrete rotary positive displacement pump.

According to one aspect, a device for printing is provided. In some embodiments, the device comprises a first microfluidic printing nozzle comprising a first mixing chamber and a first impeller disposed therein. In some embodiments, the microfluidic printing nozzle is configured with selective heating and cooling capabilities, such that the printing nozzle can be used to melt and extrude thermoplastic raw materials and deposit them onto a substrate. In some embodiments, multiple different thermoplastic raw materials may be melted in separate melting zones, and pumped into a mixing chamber in varying ratios to create polymer mixtures with varying properties. In some embodiments, the device comprises a controller configured and arranged to independently control rotation of the impeller disposed in the mixing chamber.

According to one aspect, a device for 3D-printing is provided. In some embodiments, the device comprises a microfluidic printing nozzle comprising a mixing chamber and an impeller disposed therein. In some embodiments, the device comprises a heat source or a cooling source in thermal communication with the nozzle, the pumps, the mixing chamber, the material feed to the pumps, and/or any channels connecting any of these parts. In some embodiments, the device comprises a controller constructed and arranged to control rotation of the impeller.

According to one aspect, a multi-axis system for printing an article is provided. In some embodiments, the multi-axis system comprises a print head comprising a microfluidic printing nozzle. In some embodiments, the multi-axis system comprises two inlets to the microfluidic printing nozzle. In some embodiments, multi-axis system comprises a substrate. In some embodiments, the microfluidic printing nozzle is configured to deposit a material onto the substrate. In some embodiments, the microfluidic printing nozzle and the substrate are configured to be translated relative to one another along at least one axis.

The nozzle may be controlled, for example, using a computer or other controller, in order to control the deposition of the product onto the substrate.

In one aspect, the present invention is generally directed to an article. In one set of embodiments, the article is a 3D-printed article for use in footwear. In some embodiments, the article includes a 3D-printed article having a gradient in a property between a first portion and a second portion, wherein the 3D-printed article is a single integrated material, and wherein the property is selected from the group consisting of average largest dimension of particles (e.g., reinforcing particles), weight percent of particles (e.g., reinforcing particles), volume percent of particles (e.g., reinforcing particles), compression strength, slip resistance, abrasion resistance, density, stiffness, tensile elastic modulus, shore A hardness, flexural stiffness, tensile strength, color, heat deflection temperature, pore concentration, pore size, and coefficient of thermal expansion.

In some embodiments, the article is an article for use in footwear. In some embodiments, the article includes a 3D-printed composite comprising a plurality of particles (e.g., reinforcing particles) having a largest numerical average dimension of greater than or equal to 10 microns and less than or equal to 400 microns.

In some embodiments, the article comprises a thermoplastic polymeric structure. In some embodiments, the printed article is attached onto a substrate. In some cases, the substrate is a textile. In some cases, the textile also comprises or consists of a thermoplastic with similar or identical chemical composition to the 3D printed article (e.g., both the article and the substrate are thermoplastic polyurethanes). In some cases, the composition of the substrate and the printed article may be selected such that they can be recycled without the need to separate the parts at end of life. The article may comprise particles (e.g., reinforcing particles)

distributed in the polymeric structure to form a gradient of the weight percent of particles (e.g., reinforcing particles) in the polymeric structure. In some embodiments, a textile is adhered to at least a portion of the polymeric structure.

In another aspect, the present invention is generally directed to a method. In some cases, the method includes a method for printing an article, e.g., 3D-printing an article. In one set of embodiments, the method includes melting one polymer to turn it into a first fluid, flowing the first fluid through a first inlet into a nozzle; melting a second polymer to turn it into a second fluid, flowing the second fluid through a second inlet into the nozzle; mixing the first fluid and the second fluid to form a mixture within the nozzle; and printing the mixture onto a substrate from the nozzle. In one set of embodiments, the method may further comprise using rotary positive displacement pumps to control the flow of the liquids. In another set of embodiments, the method may comprise feeding the one or more polymers to a melting zone in the form of pellets. In one set of embodiments, the melting zone may include at least part of the pump. In one set of embodiments the melting zone may be further away from the mixing chamber than the pumps. In one set of embodiments, the polymers may be fed to the melting zone in the form of filaments. In one set of embodiments, the filaments may be fed using motors that control the rate of filament feeding. In one set of embodiments, the rate of filament feeding may be adjusted to dose the polymer into the mixing chamber and control the flow rate of the polymers exiting the nozzle. In another set of embodiments, different polymers may be fed to the dosing devices through a combination of pellet form and filament form. In another set of embodiments, one dosing device may be a rotary positive displacement pump (e.g., a screw pump, e.g., a heated screw pump), and another dosing device may be a filament feed mechanism comprising two gears and a motor configured to drive one of the gears.

According to one aspect, a method for printing an article is provided. In some embodiments, the method involves melting between two and eight polymers, inclusive, in separate melting zones. In some embodiments, the method involves flowing a first fluid through a first inlet into a microfluidic printing nozzle. In some embodiments, the method involves flowing a second fluid through a second inlet into the microfluidic printing nozzle. In some embodiments, the method involves flowing at least one additional fluid through at least one additional inlet into the microfluidic printing nozzle. In some embodiments, the method involves actively mixing all of the fluids that were flowed into the mixing chamber to form a mixture. In some embodiments, the method involves depositing the mixture onto a substrate. In some embodiments, the method involves pumping two or more materials into a mixing chamber and rotating an impeller to create a mixture of the two or more inputs.

According to one aspect, a method of printing an article is provided. In some embodiments, the method involves receiving object information associated with the article. In some embodiments, the method involves identifying, using the object information, characteristics of a target material to be printed at each location of a machine tool path that will be used to create the article. In some embodiments, the method involves identifying two or more input materials to create the target material. In some embodiments, the method involves identifying a set of printer settings for printing the target material. In some embodiments, the method involves generating print instructions using the set of printer parameters. In some embodiments, the method involves printing the article using the print instructions.

According to one aspect, a method of printing an article is provided. In some embodiments, the method involves pumping more than one input into a mixing chamber at some point during a print, but only pumping one input into the mixing chamber at some point during the print. In some embodiments, the method involves continuously changing the pump rotation speeds of at least two inputs during a single print. In some embodiments, the method involves depositing the mixture onto a substrate. In some embodiments, the inputs comprise thermoplastic polyurethanes. In some embodiments, the inputs comprise thermoplastic elastomers. In some embodiments, the inputs comprise polyolefins. In some embodiments, the inputs comprise thermoplastic copolyester. In some embodiments, the inputs comprise block copolymers of polyamide and polyether. In some embodiments, the inputs comprise a polyamide. In some embodiments, the inputs comprise a combination of thermoplastics mentioned previously. In some embodiments, the tensile elastic modulus of a first input differs by at least 10% from that of a second input. In some embodiments, the tensile elastic modulus of a first input differs by at least 50% from that of a second input. In some embodiments, the tensile elastic modulus of a first input differs by greater than 75% from that of a second input.

According to one aspect, a method of printing an article is provided. In some embodiments, the method involves flowing at least two materials into a mixing chamber, wherein at least one of the materials is polymeric. In some embodiments, the method involves mixing the at least two materials in the mixing chamber containing an impeller to form a mixture. In some embodiments, the method involves depositing the mixture onto a textile.

In another aspect, the present invention is generally directed to a device. In some embodiments, the device is a device for printing, e.g., 3D-printing. In some embodiments, the device comprises a microfluidic printing nozzle comprising a mixing chamber and an impeller disposed therein, at least one heat source or a cooling source in thermal communication with the nozzle, and a controller constructed and arranged to control rotation of the impeller. In some embodiments, additional heating and cooling sources are also in thermal communication with other parts of the print head (e.g., the pumps, the melt zones, the mixing chamber, and/or the flow paths connecting any of these components).

The device, in another set of embodiments, may be a multi-axis system for printing an article, comprising a print head comprising a microfluidic printing nozzle, two or more inlets to the microfluidic printing nozzle, and a substrate, wherein the print head is configured to deposit a material onto the substrate, and wherein the substrate or microfluidic printing nozzle is configured to be translated or rotated along at least one axis to create relative motion between the microfluidic printing nozzle and the substrate.

In another set of embodiments, the device may be a multi-axis system for printing an article of footwear, comprising a print head with a microfluidic printing nozzle and a substrate, wherein the substrate comprises a component of a footwear upper, wherein the print head is configured to deposit a material onto the component of the footwear upper, and wherein at least one of the print head and/or the substrate is configured to be translated and/or rotated along and/or around at least one axis respectively. In another embodiment, the substrate may comprise a textile on a fixture, that is a component of either a footwear upper or an article of apparel. The fixture may be a flat plate. The fixture may be an adhesive film. The fixture may include an adhesive film supported by a frame and a support member. The fixture may also be a belt. The fixture may have some curvature. The curvature may be used to cure a polymer in a shape closer to the final shape than it would have been if the substrate had been flat. The curvature may also be present in the support member and may facilitate a film to substantially conform to the support member.

The device, in yet another set of embodiments, includes a microfluidic printing nozzle comprising a mixing chamber and an impeller disposed therein, and a controller constructed and arranged to laterally move the impeller within the microfluidic printing nozzle.

In another aspect, a print head is provided. In some embodiments, the print head can have a compressed gas source. In some embodiments, the print head can have a printing nozzle that comprises a mixing chamber, an impeller disposed in the mixing chamber, and two or more material inlets in fluid communication with the mixing chamber. In some embodiments, an outlet of the mixing chamber is configured to intersect with an outlet fluidly connected to the compressed gas source. In some embodiments, the outlet fluidly connected to the compressed gas source intersects the outlet of the mixing chamber such that material exiting the outlet of the mixing chamber is atomized, or is chaotically accelerated towards the substrate.

In one aspect, a print head is provided. In some embodiments, the print head is a multi-input print head, e.g., for three-dimensionally printing. In some embodiments, the print head comprises a microfluidic printing nozzle. The microfluidic printing nozzle may comprise an orifice configured to extrude material. The microfluidic printing nozzle may comprise a mixing chamber, in fluid communication with the orifice. An impeller may be disposed in the mixing chamber. The mixing chamber and/or the impeller may be configured to mix the material. In some embodiments, the mixing chamber is in thermal communication with at least one heating device and/or at least one temperature measuring device. In some embodiments, the print head comprises a first input comprising a first rotary positive displacement pump in fluid communication with the mixing chamber of the microfluidic printing nozzle. In some embodiments, the print head comprises at least a second input comprising a second rotary positive displacement pump in fluid communication with the mixing chamber. In some embodiments, the print head comprises a motor mechanically connected to the impeller and configured to rotate the impeller at a rate of greater than 300 rotations per minute (RPM). In some embodiments, the at least one heating device is configured to heat the mixing chamber to a temperature greater than 100 degrees Celsius.

In some embodiments, at least one of the rotary positive displacement pumps is further in thermal communication with a heating device. In some embodiments, at least one of the rotary positive displacement pumps is in thermal communication with both a heating device and a cooling device. In some embodiments, at least one of the rotary positive displacement pumps is configured to consistently maintain an average temperature that differs by at least 5 degrees Celsius from that of the mixing chamber.

In some embodiments, the print head further comprises a shaft seal to prevent backflow of the material in the mixing chamber. In some embodiments, all of the components of the shaft seal comprise a metal. In some embodiments, at least a component of the shaft seal is fabricated from a substance comprising graphite, graphene, and/or carbon nanotubes.

In some embodiments, at least one of the rotary positive displacement pumps has a maximum flow rate in the range of greater than or equal to 1 mL/min and less than or equal to 100 mL/min. In some embodiments, each of the rotary positive displacement pumps is connected to a cooling system, such that each pump is configured to be quickly cooled when not in use. In some embodiments, the cooling system comprises a fan and/or a heat sink in thermal communication with each pump, none of the pumps, only one pump, or at least one pump. In some embodiments, each of the rotary positive displacement pumps is configured to receive thermoplastic pellets from separate hoppers.

In some embodiments, the volume of the mixing chamber is less than 1 mL.

In some embodiments, the rotational rate of each pump is independently controllable in the range of greater than or equal to 0 RPM and less than or equal to 500 RPM.

In some embodiments, a volume between an exit, of each rotary positive displacement pump respectively, and an entry to the mixing chamber is less than 2 mL.

In some embodiments, the print head further comprises an additional input configured to deliver a liquid purge material into the mixing chamber.

In some embodiments, at least the first input pump comprises a heated screw pump, and/or at least the second input pump comprises a filament feed mechanism.

In another aspect, a system is provided. In some embodiments, the system is a system for digitally printing. In some embodiments, the system comprises a print head as described herein. In some embodiments, the system comprises a robotic system configured to move the print head relative to a substrate along at least one axis, e.g., along at least two axes. In some embodiments, the substrate is configured to be heated to a temperature of at least 40 degrees Celsius. In some embodiments, the robotic system comprises a robotic arm to move substrates into and/or out of the system. In some embodiments, the system further comprises tubing configured to feed thermoplastic pellets into each of the rotary positive displacement pumps. In some embodiments, the system further comprises an ink-jet system configured to deposit multiple colors of ink droplets onto the same substrate, and/or to deposit multiple colors of ink droplets onto material deposited from the print head. In some embodiments, the system further comprises a cleaning station, wherein the cleaning station comprises either a brush, a squeegee, or both.

In another aspect, a method is provided. In some embodiments, the method is a method for printing a three-dimensional thermoplastic part. In some embodiments, the method uses a print head, e.g., a print head having a microfluidic printing nozzle. In some embodiments, the method comprises heating to a temperature greater than 100 degrees Celsius, by use of at least one heating device, a mixing chamber of the microfluidic printing nozzle. In some embodiments, the method comprises pumping, into the mixing chamber, at least a first fluid polymeric material and a second fluid polymeric material through at least a first inlet and a second inlet respectively, by use of a first pump and a second pump respectively. In some embodiments, each of the first pump and the second pump comprises a rotary positive displacement pump. In some embodiments, the method comprises actively mixing at least the first fluid polymeric material and the second fluid polymeric material using an impeller in the mixing chamber. In some embodiments, the method comprises extruding the mixture of at least the first fluid polymeric material and the second fluid polymeric material onto a substrate. In some embodiments, the three-dimensional thermoplastic part has a gradient in one or more material properties. In some embodiments, the method further comprises melting at least a first polymeric material and a second polymeric material in separate melting zones of the print head to form the first fluid polymeric material and the second fluid polymeric material.

In some embodiments, at least the ratio of the first fluid polymeric material to the second fluid polymeric material is changed over time. In some embodiments, each of at least the first fluid polymeric material and the second fluid polymeric material is in the form of a pellet or powder before it is melted.

In some embodiments, the print head is mounted on a robotic system by which the print head can move along at least one axis.

In some embodiments, each of the one or more material properties is selected from the group consisting of: stiffness, Shore A hardness, pore size, density, color, surface roughness, reflectivity, strength, elongation at break, tensile elastic modulus, modulus at 100% strain, opacity, dimensional change upon heat activation, tensile elastic modulus, shore A hardness, nanoindentation hardness, and flexural modulus. In some embodiments, at least one of—e.g., each of—the one or more material properties differs by at least 10% between a first portion and a second portion of the three-dimensional thermoplastic part that is printed.

In some embodiments, the substrate is a textile. In some embodiments, the textile is a component of a shoe. In some embodiments, the three-dimensional thermoplastic part that is printed is a component of a shoe upper. In some embodiments, the three-dimensional thermoplastic part that is printed is a component of an article of apparel.

In some embodiments, the method further comprises inkjetting a pigmented inkjet ink onto at least a portion of the substrate. In some embodiments, the method further comprises inkjetting a pigmented inkjet ink onto at least a portion of the three-dimensional thermoplastic part that is printed.

In some embodiments, the three-dimensional thermoplastic part that is printed comprises, by at least 50 volume % —or by at least 50 weight %, or by at least 50 mass % —relative to the total volume—or total weight, or total mass—of the three-dimensional thermoplastic part, a polymer selected from the group consisting of: a thermoplastic polyurethane, a thermoplastic elastomer, a polyolefin, a polyester, a polyester terephthalate, a polyamide, a nylon, an acrylonitrile-butadiene-styrene copolymer, and a polyethylene. In some embodiments, both the three-dimensional thermoplastic part that is printed and the substrate that the three-dimensional thermoplastic part is printed onto comprise, by at least 50 volume % —or by at least 50 weight %, or by at least 50 mass % —relative to the total volume—or total weight, or total mass—of the three-dimensional thermoplastic part or the substrate respectively, a polymer selected from the group consisting of: a thermoplastic polyurethane, a thermoplastic elastomer, a polyolefin, a polyester, a polyester terephthalate, a polyamide, a nylon, an acrylonitrile-butadiene-styrene copolymer, and a polyethylene.

In some embodiments, the melting zones are maintained at average temperatures that differ by greater than 5 degrees Celsius from one melting zone to another melting zone. In some embodiments, the respective pumps are maintained at average temperatures that differ by greater than 5 degrees Celsius from one pump to another pump. In some embodiments, both the melting zones and the respective pumps are maintained at average temperatures that differ by greater than 5 degrees Celsius from one melting zone to another melting zone and from one pump to another pump respectively.

Other advantages and novel features of the present invention will become apparent from the following detailed description of various non-limiting embodiments of the invention when considered in conjunction with the accompanying figures.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

The present invention generally relates to the printing of articles (e.g., of footwear), using 3-dimensional printing and other printing techniques, including the use of one or more mixing nozzles, and/or multi-axis control over the translation and/or rotation of the print head or the substrate onto which the articles are printed. For clarity, the term "substrate" may refer to any media onto which the print head and/or microfluidic printing nozzle deposits material. In some embodiments, the substrate may be supported by one or more substrate support members. As a non-limiting example, a textile substrate may be disposed on an adhesive film support member, which is further disposed on a rigid substrate support member having a curved shape. In some embodiments, a material may be prepared by extruding material through print head comprising a nozzle, such as a microfluidic printing nozzle, which may be used to mix materials within the nozzle and direct the resulting product onto a substrate. The print head and/or the substrate may be configured to be translated and/or rotated, for example, using a computer or other controller, in order to control the deposition of material onto the substrate.

Figure 17:
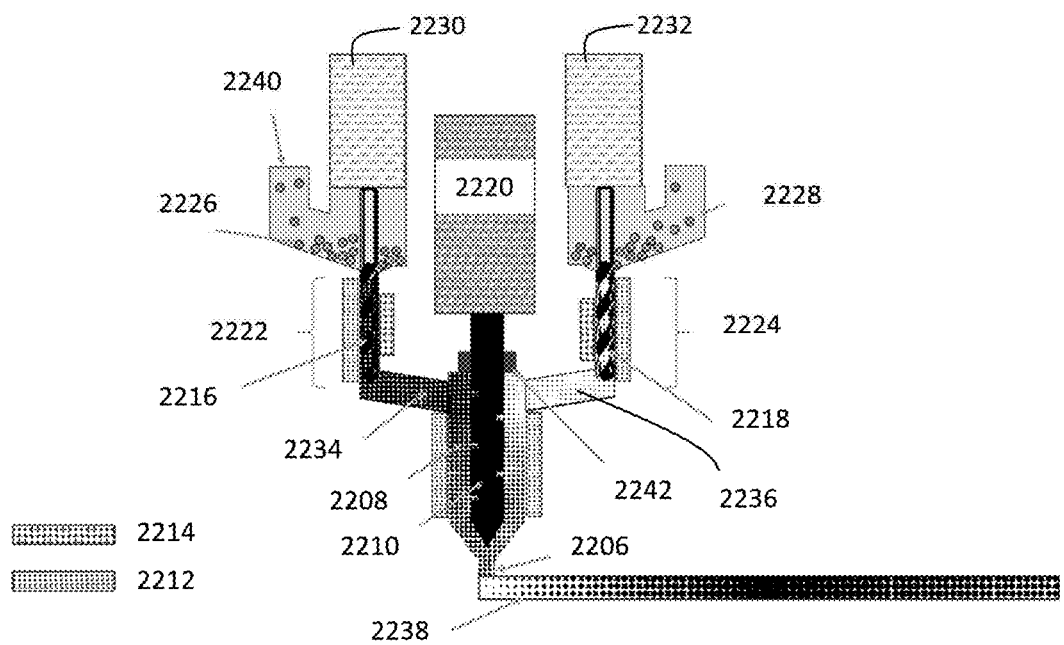
FIG. 17 is a schematic of an illustrative extrusion print head having two polymeric (e.g., thermoplastic) material (e.g., pellet) inputs and configured for printing graded (e.g., mechanically graded) polymeric parts (e.g., thermoplastic parts), in accordance with some embodiments.
Figure 18:
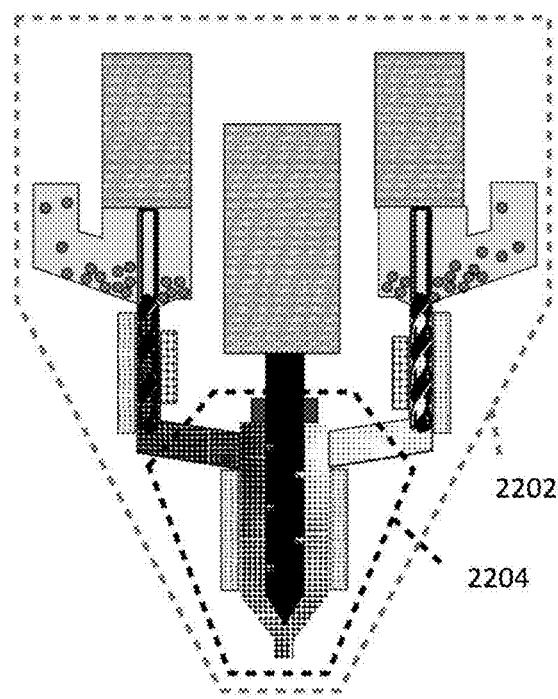
FIG. 18 is a schematic demonstrating the distinction between the entire print head of FIG. 17 and a portion of the print head that is a microfluidic printing nozzle, in accordance with some embodiments.

According to one aspect, a print head comprising a microfluidic printing nozzle is provided. For example, FIGS. 17-18 show the components of an entire print head, and a region of a microfluidic printing nozzle, respectively, in accordance with some embodiments. In some embodiments, the microfluidic printing nozzle comprises at least two (e.g., at least three, at least four) material inlets in fluid communication with a mixing chamber. In some embodiments, the device comprises an impeller disposed in the mixing chamber. In some embodiments, at least two of the material inlets are each in fluid communication with a discrete rotary positive displacement pump. In some embodiments, the impeller is also combined with a shaft seal. The shaft seal may form a seal around the circumference of the impeller in one or more locations. The shaft seal may prevent material in the mixing chamber from flowing upwards towards the motor driving the impeller's rotation. In some cases, the impeller may have multiple types of seals. One seal may seal effectively for rotation, and the other may seal effectively for linear translations to facilitate movement of the impeller vertically inside of the mixing chamber. The shaft seal may be any type of shaft seal. Some non-limiting examples of types of shaft seals include: o-rings, rubber bellows seals, metal bellows seals, face seals, and microlip seals. One of ordinary skill in the art would recognize that there are many types of rotary and linear shaft seals that could be used to prevent backflow of the material. In some cases, the seals may be made of a polymer (e.g., polytetrafluoroethylene (PTFE)). In other cases, the seals may be made from a rubber (e.g., ethylene propylene diene monomer rubber (EPDM rubber)). In some cases, the seals may be made of one or more metals (e.g. Stainless steel or Brass). In some cases, the seals may be made of a ceramic (e.g. Silicon Carbide (SiC)). In some cases, the seal may be a composite (e.g. graphite-loaded PTFE). In some cases, the seal may be made of a carbon based substance (e.g. graphite, graphene, carbon nanotubes). In some cases, a seal may comprise multiple components, where different components are made of any of the materials referenced above (e.g., a seal having a metal spring, and a PTFE shaft contact point). In some cases, the seal may be chosen to withstand pressures ranging from 1 pound per square inch (PSI) to 5000 PSI, inclusive. A preferred range may be pressures ranging from 300 PSI to 3000 PSI, inclusive. In some cases, the seal material is chosen to withstand high temperatures up to 410 degrees Celsius. In some cases, the seal material may be chosen based on the speed that the shaft will turn. For example, a shaft seal material may be chosen for a shaft that spins between 300 rotations per minute (RPM) and 1000 RPM, inclusive of the endpoints of this range, or it could be chosen for a shaft that spins as fast as 10000 RPM. A preferred range may be between 500 RPM and 3500 RPM, inclusive of the endpoints of this range.

In some embodiments, at least one, at least two, at least three, at least four, and/or the at least four material inlets are each in fluid communication with a discrete rotary positive displacement pump. In some embodiments, at least one, at least two, at least three, at least four, and/or each of the rotary positive displacement pumps comprises e.g. an auger, a gear pump, a progressive cavity pump, a micro-annular gear pump, a rotary lobe pump, a vane pump, a screw, a screw pump, an auger pump, a twin screw pump, a Lobe pump, a Cam pump, a Peristaltic pump, or combinations thereof. In some embodiments, the article comprises at least a second gear pump. In some embodiments, at least some of the pumps that push material through the inlets comprise gear pumps. In some embodiments, the article comprises at least a second progressive cavity pump. In some embodiments, at least some of the pumps comprise progressive cavity pumps. In some embodiments, the article comprises at least a second screw pump. In some embodiments, at least some of the pumps comprise screw pumps. In some embodiments, the rotary positive displacement pump comprises e.g. a rotary lobe pump, a vane pump, a screw, a twin screw pump, a Lobe pump, a Cam pump, a Peristaltic pump. In some embodiments, at least some of the pumps comprise e.g. Lobe pumps, Cam pumps, or Peristaltic pumps, or combinations thereof. In other embodiments, the pump may be a filament feed mechanism having a drive gear connected to a motor configured to push a filament into one of more of the inlets. In some embodiments, a filament feed mechanism may be combined with any of the earlier discussed rotary positive displacement pump types. In some embodiments, at least one inlet is in fluid communication with a rotary positive displacement pump, e.g. a progressive cavity pump, a gear pump, an auger, a rotary lobe pump, or a vane pump. In some embodiments, at least four of the rotary positive displacement pumps each comprise a progressive cavity pump. In some embodiments, the progressive cavity pump is operated by a controller that is in communication with a computer. In some embodiments, at least two of the inputs comprise screw or auger pumps, and each are connected to a controller.

In some embodiments, the microfluidic printing nozzle comprises four or more inlets to the mixing chamber. In some embodiments, at least one of the inlets, at least two of the inlets, at least three of the inlets, or at least four of the inlets are each connected to a respective rotary positive displacement pump. In some embodiments, e.g. at least four material inputs or at least five material inputs are each in fluid communication with a discrete rotary positive displacement pump.

In some embodiments, at least one of the material inlets is outfitted with a mechanical valve adjacent to the mixing chamber. In some embodiments, the mechanical valve comprises e.g. a needle valve, a pinch valve, a spool valve, or a ball valve, or combinations thereof. In some embodiments, the mechanical valve is a passive one-way valve. In some embodiments, the mechanical valve is an active valve with a linear actuator.

In some embodiments, the volume of the mixing chamber is from 30 nanoliters (nL) to 500 microliters. In some embodiments, the volume of the mixing chamber is e.g. less than 400 microliters, less than 300 microliters, less than 200 microliters, less than 100 microliters, less than 50 microliters. In some embodiments the volume of the mixing chamber ranges from 500 microliters to 2 milliliters, inclusive.

In some embodiments, the microfluidic printing nozzle further comprises e.g. at least five, at least six, at least seven, or at least eight material inputs in fluid communication with a mixing chamber.

In some embodiments, each of the material inlet pumps and the impeller motor is in electrical communication with a controller.

In some embodiments, the microfluidic printing nozzle has at least one input at a upstream location with respect to the flow direction of the microfluidic nozzle, with respect to the other material inlets. In some embodiments, at least one of the mixing chamber, and/or the material inlet channels comprises a pressure transducer in sensing communication with the controller. In some embodiments, the microfluidic printing nozzle contains at least one of a heat source, and/or cooling source, and/or a temperature measuring device, in communication with the controller. In some embodiments, the impeller can be actuated relative to the mixing chamber to close off the exit to the mixing nozzle, acting as a needle valve. In some embodiments, the impeller can be actuated relative to the mixing chamber to change the volume of the mixing chamber. In some embodiments, the mixing chamber is a separate body that is removable. In some embodiments, both the mixing chamber and the impeller are removable and designed to be used as a pair. In some embodiments, different impeller and mixing chamber combinations might be used for different target material flow rates.

In some embodiments, one or more valves may be configured to relieve any internal pressure that has built up in the article after flow has stopped.

In some embodiments, the substrate comprises a footwear last. In some embodiments, the substrate may be a release film supported by a frame or other structure. In some cases, the substrate is a release paper, or a polymer film that the printed polymer adheres poorly to. In some embodiments, a textile is the substrate. In some embodiments, the substrate may comprise a combination of materials (e.g., a textile disposed on a release film, wherein the material is printed onto the textile in some areas, and onto the release film in other areas). In some embodiments, the textile is a component of an article of footwear. In some embodiments, the textile is an upper. In some embodiments, the textile is an article of apparel. In some embodiments, the textile is a component of a sporting good (e.g., bag, glove, grip, tent, ball).

In some embodiments, an article that is printed (e.g., 3D-printed) may comprise a composite. In some embodiments, a composite may comprise a matrix and a plurality of particles (e.g., reinforcing particles). The matrix may include materials such as thermoplastic polyurethane or other suitable polymers, which may be used to facilitate manufacturing of articles. Examples of polyurethanes and other suitable polymers include those described in greater detail below. In some embodiments, the composite may comprise a foam, although this is not a requirement in every embodiment. The particles (e.g., reinforcing particles), in some cases, may provide for increased slip resistance, e.g., due to increased friction. In some cases, the particles may provide increased toughness or resistance to abrasion, for example, of a surface. In certain cases, the particles may be used for texture, for example, to produce a coarser or more bumpy surface texture to an article, to produce a certain appearance or "sheen" to the surface of an article, or the like.

In addition, in other embodiments, other materials may be used for reinforcing particles, e.g., in addition to and/or instead of rubber particles. Non-limiting examples include silica, fumed silica, silicon carbide, titanium dioxide, fibers, carbon, carbon fiber, gypsum, glass fiber, calcium carbonates, nanorods, microrods, carbon fibers, thermoplastics, or the like. In some embodiments, the particles may comprise silicone particles, wax particles, or polytetrafluoroethylene particles, or combinations thereof. In some embodiments, the particles (e.g., reinforcing particles) may comprise a thermoplastic polyurethane that has a blowing agent inside that has yet to be expanded, or an expanded thermoplastic polyurethane. In some embodiments, the particles (e.g., reinforcing particles) comprise a blowing agent that decomposes to gas above an activation temperature. In some embodiments, the particles comprise azodicarbonamide particles, sodium bicarbonate particles, hydrazine particles, toluenesulfonylhydrazine particles, or oxybisbenzenesulfonylhydrazine particles, or combinations thereof. In some embodiments, reinforcing particles may comprise hollow or solid spheres. Such spheres may comprise, as non-limiting examples, glass or polyurethane. For example, the spheres may be hollow elastomer spheres (e.g., hollow polyurethane spheres), and the density of a composite including these spheres may be reduced relative to the density of a substantially similar composite not including these spheres.

Particles (e.g., reinforcing particles) may, in some embodiments, have a largest numerical average dimension of at least 10 microns, at least 20 microns, at least 30 microns, at least 40 microns, at least 50 microns, at least 60 microns, at least 70 microns, at least 80 microns, at least 90 microns, at least 100 microns, at least 150 microns, at least 200 microns, at least 250 microns, at least 300 microns, at least 350 microns, at least 400 microns, at least 500 microns, at least 700 microns, or at least 900 microns. In some embodiments, the particles (e.g., reinforcing particles) may have a largest numerical average dimension of at most 1000 microns, at most 900 microns, at most 700 microns, at most 500 microns, at most 400 microns, at most 350 microns, at most 300 microns, at most 250 microns, at most 200 microns, at most 150 microns, at most 100 microns, at most 90 microns, at most 80 microns, at most 70 microns, at most 60 microns, at most 50 microns, at most 40 microns, at most 30 microns, or at most 20 microns. Combinations of the above-referenced ranges are also possible (e.g., at least 10 microns and at most 1000 microns, or at least 50 microns and at most 400 microns, or at least 50 microns and at most 250 microns). The particles may be spherical and/or non-spherical. In some cases, the particles may be present in a range of sizes and/or shapes (e.g., as in the case of crumb rubber or ground tire rubber).

In some embodiments, the incorporation of particles (e.g., reinforcing particles) into a composite may result in a change (e.g., an improvement) in the performance of the composite with respect to one or more properties (e.g., abrasion resistance, slip resistance, or the like). As a non-limiting example, a composite having particles (e.g., reinforcing particles) may have greater abrasion resistance and/or greater slip resistance than a substantially similar composite lacking such particles. As another non-limiting example, a composite may have a lower overall density than a substantially similar composite lacking particles (e.g., reinforcing particles).

In some embodiments, the incorporation of a certain type of particle (e.g., reinforcing particle) into the matrix of the composite may result in a change (e.g., an improvement) in the performance of the composite with respect to one or more properties (e.g., physical properties, environmental sustainability, cost, or the like). In some cases, the use of a filler (e.g., ground tire rubber) may be beneficial in the object of environmental sustainability. As a non-limiting example, less waste may be produced in producing a composite comprising recycled materials, such as ground tire rubber particles.

In addition, certain aspects of the invention are generally directed to methods for printing an article, for example, an article comprising a composite (e.g., a composite comprising particles, e.g., reinforcing particles).

Figure 15:
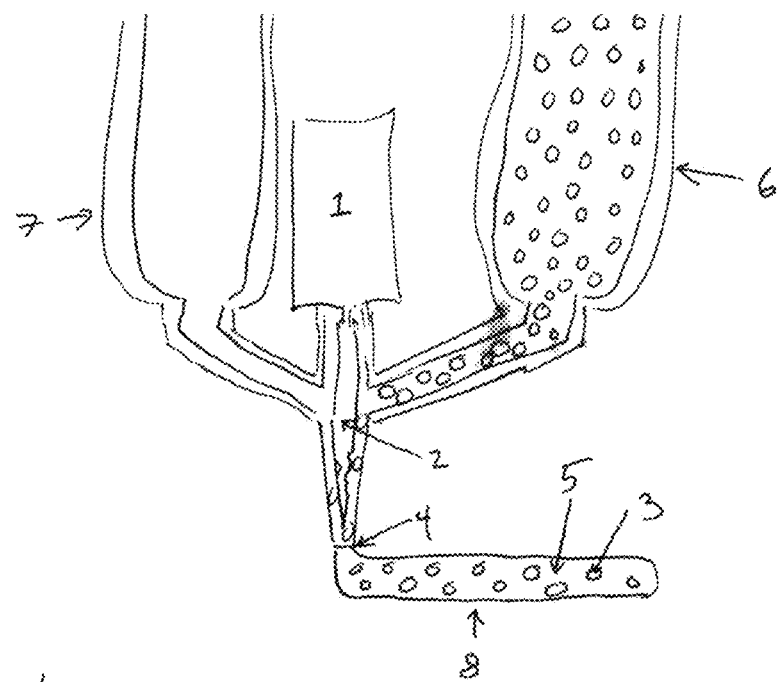
FIG. 15 illustrates a mixing nozzle and associated hardware printing a composite material in accordance with another embodiment of the invention.

In some embodiments, printing an article (e.g., comprising a composite) may include flowing particles (e.g., reinforcing particles, e.g., comprising recycled tire rubber) into a nozzle (see, e.g., FIG. 15). The nozzle may be a microfluidic printing nozzle. In some cases, the particles (e.g., reinforcing particles) flowing into the nozzle are contained within a fluid entering the nozzle. If more than one fluid enters the nozzle, the particles (e.g., reinforcing particles) may be in any one or more of the fluids. See also U.S. Pat. Apl. Ser. No. 62/464,363, entitled "Techniques and Systems for Three-Dimensional Printing of Foam and Other Materials," filed Feb. 27, 2017, incorporated herein by reference in its entirety.

In some embodiments, the particles (e.g., reinforcing particles) may be present in an article, e.g., after formation, such that the article has a weight percent of particles (e.g., reinforcing particles) of at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, or at least 85 wt % with respect to the total weight of the article. In some embodiments, the article has a weight percent of particles (e.g., reinforcing particles) of at most 90 wt %, at most 85 wt %, at most 80 wt %, at most 75 wt %, at most 70 wt %, at most 65 wt %, at most 60 wt %, at most 55 wt %, at most 50 wt %, at most 45 wt %, at most 40 wt %, at most 35 wt %, at most 30 wt %, at most 25 wt %, at most 20 wt %, at most 15 wt %, or at most 10 wt % with respect to the total weight of the article. Combinations of the above-referenced ranges are also possible (e.g., at least 5 wt % and at most 90 wt %).

In some embodiments, as discussed in more detail below, printing a mixture onto a substrate may comprise depositing the mixture onto a substrate in a layer. In some embodiments, printing the mixture onto a substrate may comprise depositing the mixture onto a substrate in a plurality of layers. Printing in a plurality of layers may involve depositing the mixture onto a substrate in a first layer (e.g., along a line) and then depositing the mixture onto a substrate in a second layer (e.g., along the same line, in a perpendicular line to that of the first layer, etc.). Printing (e.g., 3D-printing) a plurality of layers may involve depositing a material in a pre-determined shape with a high degree of precision and control, using for example a robotic positioning system coupled with a controller. Those of ordinary skill in the art will be aware of systems and methods for 3D-printing, which typically involves the formation of 3-dimensional shapes, e.g., as opposed to 2-dimensional coatings that take the shape of the surface that they are applied to.

A variety of 3D-printing techniques are known to those of ordinary skill in the art, and include, but are not limited to, additive manufacturing techniques such as direct ink writing (DIW), stereolithography (SL), fused deposition modeling (FDM), laser sintering, laminated object manufacturing (LOM), doctor blading, material spraying, and material jetting. In some embodiments, for example, 3D-printing comprises depositing a first material in a first layer via additive manufacturing, removing at least some material in the first layer via subtractive manufacturing, and after removing the at least some material in the first layer, depositing a second material in the first layer via additive manufacturing. In some embodiments, additive manufacturing comprises at least one member selected from the group consisting of: direct ink writing (DIW), stereolithography (SL), fused deposition modeling (FDM), laser sintering, laminated object manufacturing (LOM), doctor blading, material spraying, and material jetting. In some embodiments, subtractive manufacturing comprises at least one member selected from the group consisting of: milling, drilling, cutting, etching, grinding, sanding, planing, and turning.

In some embodiments, 3D-printing comprises receiving, by a processing device, a 3D model of an object to be printed; receiving, by the processing device, information including at least one material property of a material to be 3D-printed; and generating, by the processing device, a set of sensor-based printer control parameters to print the object based, at least in part, on the sensor input. In some implementations, the processing device is further adapted to execute instructions for initiating 3D-printing of the object in the 3D-printer; receiving, during 3D-printing, the input from the sensor associated with the 3D-printing; and adjusting at least one printing property based on the sensor input. In some variations, the sensor is a force probe, a weight sensor, an optical camera, an imaging device, an in-line imaging device, a profilometer, a laser measurement device, a 3D scanner, or an automatic digital multimeter.

In another non-limiting implementation, 3D-printing includes obtaining model data representing a 3D model of an object. This implementation also includes processing the model data to generate a set of commands to direct a 3D-printer to extrude a material to form a physical model associated with the object. The set of commands is executable to cause an extruder (e.g., comprising a mixing nozzle) of the 3D printer to deposit a first portion of the material corresponding to a first portion of the physical model, to clean, to purge, or to clean and purge the extruder after depositing the first portion of the material, and to deposit a second portion of the material after cleaning the extruder. The second portion of the material corresponds to a second portion of the physical model.

In certain embodiments, a printed article (e.g., a 3D-printed article comprising a composite) may have a smallest dimension of greater than 0.1 mm, greater than 1 mm, greater than 5 mm, greater than 10 mm, greater than 12 mm, greater than 14 mm, greater than 16 mm, greater than 18 mm, or greater than 20 mm.

In certain embodiments, a printed article (e.g., a 3D-printed article comprising a composite) may have an average largest dimension of particles (e.g., reinforcing particles) of at least 10 microns, at least 20 microns, at least 30 microns, at least 40 microns, at least 50 microns, at least 60 microns, at least 70 microns, at least 80 microns, at least 90 microns, at least 100 microns, at least 150 microns, at least 200 microns, at least 250 microns, at least 300 microns, at least 350 microns, at least 400 microns, at least 500 microns, at least 700 microns, or at least 900 microns. In some embodiments, the printed article may have an average largest dimension of particles (e.g., reinforcing particles) of at most 1000 microns, at most 900 microns, at most 700 microns, at most 500 microns, at most 400 microns, at most 350 microns, at most 300 microns, at most 250 microns, at most 200 microns, at most 150 microns, at most 100 microns, at most 90 microns, at most 80 microns, at most 70 microns, at most 60 microns, at most 50 microns, at most 40 microns, at most 30 microns, or at most 20 microns. Combinations of the above-referenced ranges are also possible (e.g., at least 10 microns and at most 1000 microns, or at least 50 microns and at most 400 microns, or at least 50 microns and at most 250 microns).

In certain embodiments, a printed article (e.g., a 3D-printed article comprising a composite) may have a tensile elastic modulus of at least 0.1 MPa, at least 0.5 MPa, at least 1 MPa, at least 5 MPa, at least 10 MPa, at least 20 MPa, at least 40 MPa, at least 80 MPa, at least 100 MPa, at least 200 MPa, at least 300 MPa, or at least 1000 MPa. In some embodiments, a printed article may have a compression strength of at most 2000 MPa, at most 400 MPa, at most 300 MPa, at most 200 MPa, at most 100 MPa, at most 80 MPa, at most 40 MPa, at most 20 MPa, at most 10 MPa, at most 5 MPa, at most 1 MPa, or at most 0.5 MPa. Combinations of the above-referenced ranges are also possible (e.g., at least 0.1 MPa and at most 500 MPa).

Figure 4:
FIG. 4 illustrates an article with a gradient in properties, in yet another embodiment of the invention.

In some embodiments, an article comprising a composite that is printed (e.g., 3D-printed) may comprise two or more portions, wherein one or more properties (e.g., average largest dimension of particles (e.g., reinforcing particles), average concentration of particles (e.g., reinforcing particles) e.g. weight percent of particles (e.g., reinforcing particles), surface roughness, compression strength, slip resistance, abrasion resistance, density, stiffness, heat deflection temperature, pore concentration, pore size, and coefficient of thermal expansion) of a first portion may differ from one or more properties of a second portion. In some embodiments, the difference in properties between the first portion and the second portion may comprise a gradient of the one or more properties (e.g., the property or properties may vary relatively smoothly from a first value in the first portion to a second value in the second portion). FIG. 4 shows one such non-limiting example of a polymer with a gradient in both color and shore A hardness. In other embodiments, there may be a sharp change in one or more of the properties at a boundary of one or more of the first portion and the second portion. In some embodiments, the article may be adhered to a textile. In some embodiments, the article may comprise a polymer. In some embodiments, the article may be a component of a shoe upper. Examples of methods of producing such particles, e.g., having differences between a first portion and a second portion, are discussed in more detail below.

In some embodiments, the method may comprise flowing at least two inputs into a mixing nozzle to form a second mixture. In some embodiments, at least two of the inputs are thermoplastics. In some embodiments, at least two of the inputs are thermoplastics with the same general composition, but with at least one physical property difference that varies by greater than 10% (e.g. two of the inputs are thermoplastic polyurethanes, but with different values of tensile elastic modulus). In some embodiments, the method may comprise depositing a second region adjacent to the first region, comprising the second mixture to form a second elastomer.

In certain embodiments, a printed article (e.g., a 3D-printed article) that comprises at least two portions comprising a composite (e.g., a printed article that comprises at least a first portion comprising a composite and a second portion comprising a composite) may have a tensile strength in the second portion of the printed article of at least 0.1 MPa, at least 0.5 MPa, at least 1 MPa, at least 5 MPa, at least 10 MPa, at least 20 MPa, at least 40 MPa, at least 80 MPa, at least 100 MPa, at least 200 MPa, at least 300 MPa, or at least 400 MPa. In some embodiments, the second portion of the printed article may have a tensile strength of at most 500 MPa, at most 400 MPa, at most 300 MPa, at most 200 MPa, at most 100 MPa, at most 80 MPa, at most 40 MPa, at most 20 MPa, at most 10 MPa, at most 5 MPa, at most 1 MPa, or at most 0.5 MPa. Combinations of the above-referenced ranges are also possible (e.g., at least 0.1 MPa and at most 500 MPa).

In certain embodiments, a printed article (e.g., a 3D-printed article) that comprises at least two portions comprising a composite (e.g., a printed article that comprises at least a first portion comprising a composite and a second portion comprising a composite) may have a ratio of tensile strength in the second portion of the printed article to tensile strength in the first portion of the printed article of greater than or equal to 1.05, greater than or equal to 1.1, greater than or equal to 1.2, greater than or equal to 1.3, greater than or equal to 1.5, greater than or equal to 2, or greater than or equal to 5. In some embodiments, a ratio of tensile strength in the second portion of the printed article to tensile strength in the first portion of the printed article may be less than or equal to 10, less than or equal to 5, less than or equal to 2, less than or equal to 1.5, less than or equal to 1.3, less than or equal to 1.2, or less than or equal to 1.1. Combinations of the above-referenced ranges are also possible (e.g., greater than or equal to 1.05 and less than or equal to 10).

According one aspect a device for 3D-printing is provided. In some aspects the device comprises a microfluidic printing nozzle comprising a mixing chamber and an impeller disposed therein. In some embodiments, the device comprises a controller constructed and arranged to control an actuator to laterally move the impeller within the microfluidic printing nozzle.

In some embodiments, the controller is constructed and arranged to control a motor that drives rotation of the impeller. In some embodiments, the controller is constructed and arranged to control the actuator to laterally move the impeller within the microfluidic printing nozzle while simultaneously controlling the motor to rotate the impeller. In some embodiments, the impeller is constructed and arranged to be movable to block an outlet of the microfluidic printing nozzle. In some embodiments, movement of the impeller within the microfluidic printing nozzle alters the free volume of the microfluidic printing nozzle.

Some embodiments are directed to methods of printing an article, which may include flowing at least two materials into a mixing chamber. In some embodiments, at least one of the materials is polymeric. The method may involve in some embodiments mixing the at least two materials in the mixing chamber containing an impeller to form a mixture. The method may also include depositing the mixture onto a textile. In some embodiments, the mixed material flows through an orifice and onto the surface of a textile.

In some embodiments, the method may involve flowing the at least two materials into the mixing chamber while rotating the impeller in the mixing chamber. In some embodiments, the mixing chamber contains at least a portion of the impeller. The term "mixing chamber" may refer to the volume in which the at least two materials that are mixed together occupy from when they first touch each other, to when they stop being mechanically influenced by active motion of a mixing part (e.g., impeller). In some embodiments, the mixing chamber and the impeller share at least some volume, e.g. the impeller occupies at least some of the dead volume of the mixing chamber. In some embodiments, the amount of dead volume in the mixing chamber that is not occupied by the impeller is less than 500 microliters.

In some embodiments, the method may involve flowing the at least two materials into the mixing chamber through at least two discrete material inlets. In some embodiments, the method may involve flowing the at least two materials into the mixing chamber through at least three discrete material inlets. In such embodiments, there may be at least three materials flowed into the mixing chamber. In some embodiments, the method may involve flowing the at least two materials into the mixing chamber through at least four discrete material inlets. In such embodiments, there may be at least three or four or more materials flowed into the mixing chamber. In some embodiments, a ratio (e.g., a volume ratio, a weight ratio) between the 2, 3, 4, or more materials may be changed with time. In some embodiments, within a single print, a ratio (e.g., a volume ratio, a weight ratio) between two materials of at least two materials, entering into two corresponding inlets of at least two inlets, may vary from 1:0 to 0:1, and all ratios in between.

In some embodiments, input materials start off as thermoplastic solids, and are melted into discrete liquids before entering the mixing chamber. In some embodiments, these melted thermoplastic liquids are mixed as liquids in the mixing chamber to create a liquid mixture. In some embodiments, these liquid mixtures rapidly solidify after exiting the mixing chamber. In some cases, a device is used to cool the thermoplastic liquids after they exit the mixing chamber. In some non-limiting cases, the cooling device is a fan that blows air at the exit of the mixing chamber. In some embodiments, the mixture is a viscoelastic complex fluid. In some embodiments the mixture is in direct fluid communication with the mixing chamber during the time of deposition onto the substrate (e.g., textile). As a non-limiting example, the mixture is not jetted into discrete droplets from a standoff distance from the substrate (e.g., textile), but instead contacts simultaneously an outlet from the mixing chamber (e.g., nozzle orifice) and the substrate (e.g., textile) while the mixture is continuous with itself. In some embodiments, the mixture may not be in direct fluid communication with the substrate. As a non-limiting example, an outlet of the mixing chamber may intersect with a compressed gas stream that atomizes the mixture into discrete droplets and propels them towards the substrate. In some embodiments, a compressed gas stream may propel the mixture onto the substrate from a distance without actually atomizing the mixture into discrete droplets. In these cases, the compressed gas stream may cause the mixture (e.g., the polymer) to be elongated and whip chaotically before landing on a substrate. In some embodiments, a single print may include regions of the print where a material (e.g., a mixture) in the mixing chamber is in direct fluid communication with the substrate, and other regions where a material (e.g., a mixture) is not in direct fluid communication with the substrate (e.g. some parts are extruded onto the substrate, and other parts are sprayed onto the substrate from a distance, respectively). In some embodiments, a material (e.g., a mixture) that is sprayed may be injected into the mixing chamber from different inputs than a material (e.g., a mixture) that is extruded.

In some embodiments, the method may involve controlling the execution of the method using a controller. The method may involve varying the volumetric flow ratios of the at least two materials based on the spatial location of the mixing chamber with respect to the textile.

In some embodiments, the change in the volumetric flow ratios between the at least two materials changes at least one property of the deposited mixture. In some embodiments, at least two of the at least two materials have different concentrations of the same type of bond (e.g. urethane bonds), and changing the ratio changes at least one property of the mixture (e.g. Shore A hardness or Tensile elastic modulus). In some embodiments, the change in the volumetric flow ratios between the at least two materials changes at least one property of the deposited mixture after a chemical reaction has occurred in the deposited mixture. In other cases, no chemical reaction is required to change the property, and the property change is driven by the mixture composition. The change in mixture composition may change one or more characteristics, e.g., the average molecular weight of the mixture, the concentration of hydrogen bonding sites, the degree of entanglement, or the concentration of a plasticizer in the mixture. The change in the volumetric flow ratios between the two or more materials may influence the properties of the deposited structure before all chemical reactions have occurred, after all chemical reactions have occurred, or both before and after chemical reactions. In some embodiments, the at least one property that has changed is selected from the group consisting of tensile elastic modulus, tensile strength, tensile 100% modulus, hardness, viscosity, dynamic yield stress, static yield stress, density, particle concentration, color, opacity, and surface roughness, or a combination thereof.

In some embodiments, the textile onto which the mixture is deposited is substantially flat. In some embodiments, the textile conforms to a substrate support member that is curved in one or more dimensions (e.g., two or three dimensions). In some embodiments, the textile is supported by a belt that can translate the textile in one or more dimensions (e.g., two or three dimensions). In some embodiments, the textile is handled in a roll to roll process. In some embodiments, the textile itself acts as a belt that can move the textile surface with respect to the mixing chamber. In some embodiments, the textile is a component of a shoe upper. In some embodiments, the textile is a component of apparel. In some embodiments, the textile is a component of a knit shoe upper.

In certain cases, a mixture may be deposited onto an article disposed on a substrate support. The article may be a component of an article of footwear (e.g., an upper), or may be an article of footwear (e.g., a shoe). The substrate support may be configured to hold the article in an advantageous shape, such as an advantageous shape for footwear applications. In some embodiments, the substrate or substrate support may be a shoe last. Non-limiting examples of suitable combinations of substrates and substrate supports include but are not limited to lasted three dimensional shoe uppers on shoe lasts and lasted full shoes on shoe lasts, textiles cut into a shape of upper flat patterns in a flat form factor, and textiles cut into a shape of upper flat patterns disposed onto a substrate support that is curved in at least one dimension. Other types of substrates and substrate supports are also possible.

In some cases, at least a portion of the 3D printed article and/or a portion of the substrate onto which the article was printed is/are thermally formed after printing. This process may facilitate the article's taking on the shape of a different substrate support or form (e.g. a footwear last). In other cases, the thermal forming may add an additional feature or texture (e.g. grooves). In some cases, the printed article may be deformed or textured through an embossing process. In a non-limiting example, the 3D printed article may be shaped to a footwear last by exposing the article to elevated temperatures while it is on a footwear last.

In some embodiments, one or more material inputs may comprise a thermoplastic polymer (also referred to herein as a thermoplastic), or a polymer that can be melted into a liquid, and then re-solidified after cooling. In a non-limiting example, the thermoplastic polymer could be selected from a group consisting of: a thermoplastic polyurethane, a thermoplastic elastomer, a thermoplastic polyolefin elastomer, a polyolefin, a polyester, a polyester terephthalate, a polyamide, an acrylonitrile-butadiene-styrene copolymer, a nylon, a polyethylene, a block copolymer of polyamide and polyether, a thermoplastic copolyester, an ethylene vinyl acetate polymer, and a co-polymer of any of the above. In certain embodiments, two or more of the inputs may be polymers with the same base chemistry, but with different properties. In one non-limiting example, one polymer is a thermoplastic polyurethane with a shore A hardness of 55, and another polymer is a thermoplastic polyurethane with a shore D hardness of 65. When the two grades of thermoplastic polyurethane are blended together in a particular ratio, the mixture may have a shore A hardness of 95. A result similar to this may be achieved using a variety of base chemistries. In some cases, the polymers may be selected such that the mixture can be recycled together regardless of the mixing ratio. In some cases, the composition of the polymers may be selected based on the substrate material that the mixture is printed onto. For example, in the example above, the two thermoplastic polyurethane polymer inputs may be selected to match a substrate that is a thermoplastic polyurethane textile. In some cases, the composition of an entire product (e.g. a shoe with an upper, a 3D printed feature, a midsole, and an outsole) may be selected to all comprise or be composed of a material substantially similar in composition to the polymer inputs, such that the entire product can be recycled without separating it into distinct parts. In some embodiments, the substrate may also comprise or be composed of a polymer selected from the group consisting of: a thermoplastic polyurethane, a thermoplastic elastomer, a thermoplastic polyolefin elastomer, a polyester terephthalate, a polyamide, an acrylonitrile-butadiene-styrene copolymer, a nylon, a block-copolymer of polyamide and polyether, a thermoplastic copolyester, an ethylene vinyl acetate polymer, and a co-polymer of any of the above. The substrate may also be a textile comprising or composed of any of the above. The textile may be woven, may be knit, or could be a non-woven substrate. The substrate may also be a composite of any of the above polymers or mixtures with any other polymer.

In some embodiments, the polymers (e.g., thermoplastic polymer inputs) may be fed to a pump or a dosing device in the form of pellets. In other cases, the polymers (e.g., thermoplastic polymer inputs) may be fed in the form of an extruded filament. In other cases, the polymers (e.g., thermoplastic polymer inputs) may be fed in the form of shredded polymer that has been recycled from other waste products. In other cases, the polymer (e.g., thermoplastic polymer input) may be fed in the form of powder. In the case that the polymer (e.g., thermoplastic polymer input) is fed in the form of pellets, shredded polymer remnants, or powders, it may be fed via a hopper attached to one or more of the pumps, or through a tube, or through a tube attached to a hopper. In some cases, the tube or hopper may also be equipped with a pump, a vacuum attachment, or an agitator to assist in delivering the polymer particulates to the dosing pump. In the case that the polymer (e.g., thermoplastic polymer input) is fed in the form of filament, it may be pulled from a spool by a pump, or could be pushed from a pump through a rigid tube. Any combination of the above feedstocks and polymer feeding mechanisms is also possible.

In some cases, it is necessary to melt the thermoplastic polymers before they can enter the mixing chamber. In certain embodiments, it may be advantageous to include a melting zone upstream of the mixing chamber where one or more polymer inputs can be converted from a solid to a liquid by heating the one or more polymer inputs. In some embodiments, the melting zone may be in advance of (e.g., upstream of) the pump. In some embodiments, the melting zone may be downstream of the pump. In other embodiments, the melting zone may at least partially overlap with the pump (e.g., part of the volume of the pump also contributes to the polymer melting). Combinations of the above are also possible. In some embodiments, the configuration and location of the melting zone may depend on the input, and more than one melting zone may be included per input. Each input may have a different type and location of the melting zone.

In some embodiments, it is advantageous to control the temperature of at least one of the melting zones, the mixing chamber, the nozzle, the pumps, and any channels that connect these regions. It may also be advantageous to control all of these regions at different temperatures. Each polymer input may have a different melting point, and require different temperature profiles. As a non-limiting example, a print head comprising a microfluidic printing nozzle with two screw pumps may have a melting zone that is inside of the screw pumps' pumping volume. One of the inputs may have a melting zone temperature of 190 degrees Celsius, and the other melting zone may have a temperature of 205 degrees Celsius. The mixing chamber set temperature may be 200 degrees Celsius. Many temperatures are possible. The set points for each location (e.g., melt zones, pumps, connecting channels, mixing chamber, nozzle) may range from 10 degrees Celsius to 350 degrees Celsius. A preferred range may be from 160 degrees Celsius to 250 degrees Celsius, inclusive. In some embodiments, it may be advantageous to change the temperatures of each zone over time. As a non-limiting example, the temperature of the first melting zone might by 190 degrees Celsius when that input is being used, but there may be a portion of a print where that input is not used, and it becomes advantageous to cool the temperature to 125 degrees Celsius to prevent thermal degradation of the polymer that is inside of the pump when it is not in use. In certain embodiments, the mixing chamber or the melt zones may have a gradient in temperature. As a non-limiting example, the portion of the mixing chamber closest to the material inputs may have a temperature of greater than 200 degrees Celsius to facilitate melting of even the highest temperature inputs, while the portion of the mixing chamber closest to the nozzle may be maintained at a temperature of 190 degrees Celsius, or just above the melting point of the mixture.

In some embodiments, ratios between the first fluid, the second fluid, and the at least one additional fluid are modulated to control at least one property selected from the group consisting of cured material stiffness, uncured or partially uncured material viscosity, uncured or partially uncured material yield stress, material cure rate, material color, density, pore size, filler content, opacity, and surface roughness, or a combination thereof. In some embodiments, the ratios between the first fluid, the second fluid, and the at least one additional fluid are modulated to control at least two properties selected from the group consisting of cured material stiffness, uncured material viscosity, uncured material yield stress, material cure rate, material color, density, pore size, filler content, opacity, and surface roughness, or a combination thereof. In some embodiments, ratios between the first fluid, the second fluid, and at least two additional fluids are modulated to control at least two properties selected from the group consisting of cured material stiffness, uncured material viscosity, uncured material yield stress, material cure rate, material color, density, pore size, filler content, opacity, and surface roughness, or a combination thereof.

In some embodiments, the substrate is a textile. In some embodiments, the textile is an upper for athletic footwear. In some embodiments, the textile is a component of apparel. In some embodiments that substrate is a leather, or a synthetic leather or polymer film.

According to one aspect a method of printing of an article is provided. In some embodiments, the method involves receiving object information associated with the article. In some embodiments the method involves identifying, using the object information, characteristics of a target material to be printed at each location of a machine tool path that will be used to create the article. In some embodiments, the method involves identifying two or more input materials to create the target material. In some embodiments, the method involves identifying a set of printer settings for printing the target material. In some embodiments the method involves generating print instructions using the set of printer parameters. In some embodiments the method involves printing the article using the print instructions.

In some embodiments, the method comprises calculating the ratios of at least two material inputs to a microfluidic printing nozzle required to achieve the target material characteristics in each location, receiving object information comprising target material characteristics at each location of a machine tool path that will be used to create an article, calculating the ratios of at least 2 inputs to a microfluidic printing nozzle required to achieve the target material characteristics in each location. In some embodiments, the method comprises sending commands to a printing system controller that prompts the physical system to pump material from at the least two material inputs at the calculated ratios in order to fabricate the structure with the target material characteristics. In some embodiments, the method comprises sending commands to a printing system controller that prompts the physical system to pump material from at least two material inputs at the calculated ratios in order to fabricate the structure with the target material characteristics. In some embodiments, the system uses at least 3 inputs. In some embodiments, the system uses at least 4 inputs. In some embodiments, the system uses at least 5 inputs. In some embodiments, the system uses at least 6 inputs. In some embodiments, the system uses e.g. at least 7 inputs or 8 inputs.

According to one aspect a method of printing an article is provided. In some embodiments the method involves pumping at least four fluids through at least four material inputs of a microfluidic printing nozzle. In some embodiments, the method involves actively mixing the at least four fluids in the microfluidic printing nozzle to form a mixture. In some embodiments, the method involves depositing the mixture onto a substrate.

According to one aspect a method of printing an article is provided. In some embodiments, the method involves flowing at least two materials into a mixing chamber, wherein at least one of the materials is polymeric. In some embodiments, the method involves mixing the at least two materials in the mixing chamber containing an impeller to form a mixture. In some embodiments, the method involves depositing the mixture onto a textile.

In some embodiments, the method comprises flowing the at least two materials into the mixing chamber while rotating the impeller in the mixing chamber. In some embodiments, the mixing chamber contains at least a portion of the impeller. In some embodiments, the method comprises flowing the at least two materials into the mixing chamber through at least three discrete material inlets. In some embodiments, the method comprises flowing the at least two materials into the mixing chamber through at least four discrete material inlets. wherein the mixture is a liquid. In some embodiments, the mixture is in direct fluid communication with the mixing chamber during the time of deposition onto the textile, e.g. the mixture is in direct fluid communication with both the mixing chamber, and some part of the textile surface during at least some part of the deposition. In some embodiments, the method comprises controlling the execution of the method using a controller. In some embodiments, the method comprises varying the volumetric flow ratios of the at least two materials based on the spatial location of the mixing chamber with respect to the textile. In some embodiments, the change in the volumetric flow ratios between the at least two materials changes at least one property of the deposited mixture. In some embodiments, at least two of the at least two materials undergo a chemical reaction that changes at least one property of the deposited mixture. In some embodiments, the change in the volumetric flow ratios between the at least two materials changes at least one property of the deposited mixture after a chemical reaction has occurred in the deposited mixture. In some embodiments, the at least one property that has changed is selected from the group consisting of tensile elastic modulus, tensile strength, tensile 100% modulus, hardness, viscosity, dynamic yield stress, static yield stress, density, particle concentration, color, opacity, and surface roughness, or a combination thereof.

In some embodiments, the textile is substantially flat. In some embodiments, the textile conforms to a substrate support that is curved in one or more dimensions. In some embodiments, the textile is supported by a belt that can translate the textile in one or more dimensions. In some embodiments, the textile is handled in a roll to roll process. In some embodiments, the textile itself acts as a belt that can move the textile surface with respect to the mixing chamber. In some embodiments, the textile is attached to a fixture. The fixture may be configured to interact with a coupling on the printing system. The fixture may also sit on, or be attached to, a belt that moves the textile or substrate through a sequence of processes.

In some embodiments, the textile is a component of a shoe upper. In some embodiments, the textile is a component of apparel. In some embodiments, the textile is a component of a knit shoe upper. In some embodiments, the textile is a lasted three dimensional shoe upper on a shoe last. In some embodiments, the textile is a lasted full shoe on a shoe last. In some embodiments, at least one of the at least two materials comprises a filler and the article is a polymeric composite.

In some embodiments, the present invention relates to the printing of materials, using 3-dimensional printing and other printing techniques, including the printing of foams and other materials and/or the modulation of material composition and material properties through space and/or time. The nozzle may be controlled, for example, using a computer or other controller, in order to control the deposition of material onto the substrate. In some cases, gases or other materials may be incorporated into the material within the nozzle, e.g., to form a foam. However, it should be understood that the present invention is not limited to only foams; for example, other materials, including composites that comprise particles (e.g., reinforcing particles), are also included in other embodiments of the invention.

For instance, certain aspects of the invention are generally directed to devices for 3D-printing. Generally, in 3D-printing, material is controllably deposited, e.g., on a substrate, to create a product. The material may be deposited in a pattern defining the product, or that can be manipulated to create the product, e.g., by removing portions of the pattern. In some cases, a printing nozzle, such as a microfluidic printing nozzle, may be used to direct material onto a substrate. The nozzle may be controlled, for example, using a computer or other controller, in order to control the deposition of material onto the substrate.

Figure 1:
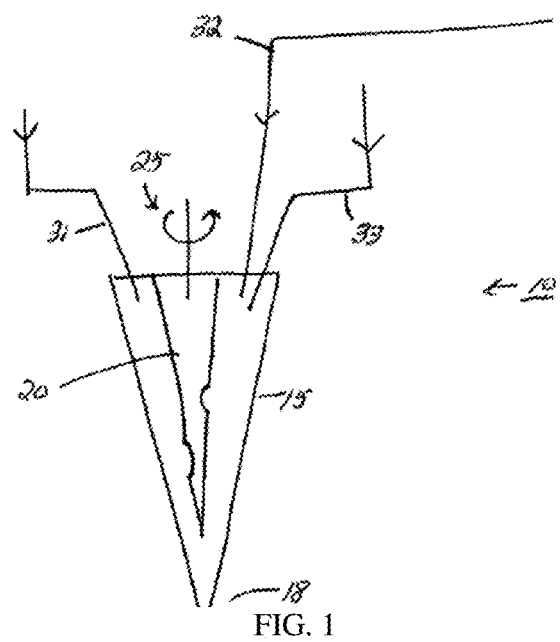
FIG. 1 illustrates a system comprising a nozzle for printing materials, in accordance with one embodiment of the invention.

One or more fluids may flow into the nozzle, and in some embodiments, mixed within the nozzle, e.g., within a mixing chamber within the nozzle to form the material to be deposited on the substrate. In some cases, active mixing may be used to mix fluids within the nozzle. For example, as is shown in FIG. 1, an impeller 20 may be spun to cause mixing within the nozzle. The impeller may have any size or shape, as discussed below. In some cases, the impeller, when spun, may substantially conform to the mixing chamber, or at least a part of the mixing chamber. Thus, for example, material flowing through the nozzle may be disrupted through spinning of the impeller (depicted in FIG. 1 as arrow 25), thereby causing mixing of the material to occur. In some embodiments, the nozzle outlet may be surrounded by a compressed gas sheath. The compressed gas sheath may guide a gas stream to intersect with the outlet of the nozzle. The gas stream may be configured to atomize a material (e.g., a mixture) that exits (e.g., is extruded from) the nozzle. The atomized material may be ejected towards the substrate. The atomized material (e.g., atomized mixture) may land on the substrate such that it forms a film of material. In some cases, the nozzle may protrude from the compressed gas sheath, such that a material (e.g., a mixture) exiting (e.g., extruded from) the nozzle can be either atomized or not atomized depending on whether the compressed gas is flowed through the compressed gas sheath. In some cases, the compressed gas sheath may be in direct fluid communication with either a valve, or a pressure regulator, or both.

In some embodiments, as discussed herein, the rotational speed of the impeller may be controlled, e.g., by a computer or other electronic controller, to control the mixing and/or direction of material exiting the nozzle. For example, the controller may control a valve or other apparatus to control the exiting of material from the nozzle, for example, as the nozzle moves relative to a substrate (or equivalently, as the substrate moves relative to the nozzle). Control of nozzle mixing and the position of the nozzle relative to the substrate may thus be used to control 3D-printing of a material onto the substrate.

In addition, in some embodiments, the material within the nozzle may be subjected to heating or cooling. This may, for example, be used to control mixing and/or reaction within the material, to keep the temperature at substantially the temperature of the surrounding environment (e.g., at room temperature), to prevent the surrounding environmental conditions and/or the heat generated by friction of the impeller and exotherm of the material curing from affecting the reaction or the printing parameters, or the like. Any method may be used to heat or cool the material within the nozzle. For example, heating or cooling may be applied to the nozzle itself, and/or to material within the nozzle. Non-limiting examples include electrical heating, Peltier cooling, application of infrared light, or other techniques such as those discussed herein.

As mentioned, one or more fluids may enter the nozzle to be mixed together. The fluids may enter via a common inlet, and/or via separate inlets, for example, as is illustrated in FIG. 1 with inlets 31, 32, and 33. Although 3 inlets are illustrated in this figure, this is by way of example only, and in other embodiments, more or fewer inlets are also possible. The inlets may independently be at the same or different distances away from an outlet of the nozzle. In some cases, the fluids may react upon contact with each other; thus, the fluids are kept separate prior to entrance into the nozzle, for example, using one or more inputs and/or valves to control contact of the fluids with each other. For example, one or more valves may be present on one or more of the inlets to control the flow of fluid through the inlets, e.g., into the nozzle. Examples of valves that can be used include needle valves, ball valves, gate valves, butterfly valves, or other suitable types of valves. Additionally, other types of apparatuses to control fluid flow may also be used, in addition to and/or instead of valves.

In some embodiments, multiple one part systems that have compatibility with one another can be used as inputs into the microfluidic active mixing nozzle system. In some embodiments, each one part system may have a different material property or properties, e.g. stiffness, density, filler content, and/or blowing agent content. In some embodiments, the ratios between two or more inputs can be varied to modulate these properties. It should be understood that any of the embodiments relating to multi-part reactive systems may also be applied to the active mixing of one part systems to vary material properties.

In some embodiments, as also described elsewhere herein, an article disposed on a substrate support may be a fabric, such as a knitted fabric or a woven fabric. The fabrics may comprise one or more features which include one or more portions that are knitted or woven to form a pattern that may be detectable optically. The feature(s) may either be created inline (e.g., during the knitting or weaving process used to form the fabric), or may be added to the fabric after it has been formed. In some embodiments, the feature(s) may comprise portion(s) of a pattern (e.g., a repeating motif) knitted or woven into the fabric or printed onto the fabric.

In certain embodiments, an article (e.g., an article of footwear, a component of an article of footwear, an article of apparel such as a sports bra, a component of an article of apparel such as a sports bra) as described herein may be produced on a multi-axis deposition system, and/or a method as described herein may include at least one step that is performed on a multi-axis deposition system. In general, and as described further below, multi-axis deposition systems include a print head, comprising a microfluidic printing nozzle, and a substrate. The print head may be any suitable print head configured to deposit a material onto the substrate. The substrate may be any suitable substrate onto which a material may be deposited; in some embodiments, one or more articles may be used as substrates (e.g., a component of an article of footwear, an upper, a sock liner) and may be disposed on a substrate support. In certain embodiments, one or both of the print head and substrate may be translated along one or more axes and/or rotated around one or more axes. Translation and/or rotation of the print head and/or substrate may facilitate the position of the print head with respect to the substrate to be changed prior to, during, and/or after a printing process. In some cases, translation and/or rotation of the print head and/or the substrate may facilitate the print head to deposit material onto a wide variety of substrate surfaces and/or facilitate the print head to deposit material onto the substrate at a wide variety of angles. In some embodiments, the print head may be configured to be rotated and/or translated such that it can deposit material onto each surface of the substrate.

Figure 8:
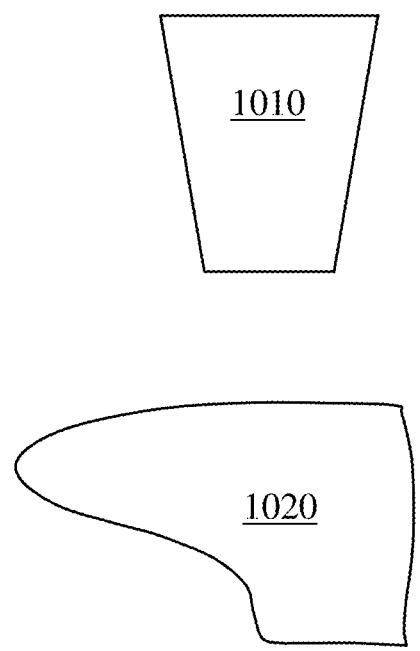
FIG. 8 is a schematic depiction of a print head and a substrate, according to certain embodiments of the invention.

FIG. 8 shows one non-limiting embodiment of a multi-axis deposition system 1000 comprising print head 1010 and substrate 1020. The print head, substrate, and multi-axis deposition system will be described in further detail below.

A print head in a multi-axis deposition system may be any suitable print head configured to deposit a material of interest onto the substrate. In some embodiments a multi-axis deposition system may comprise two or more print heads. Non-limiting examples of suitable print heads include a direct write head, a mixing nozzle, an ink jet head, a spray valve, an aerosol jet print head, a laser cutting head, a hot air gun, a hot knife, an ultrasonic knife, a sanding head, a polishing head, a UV curing device, an engraver, an embosser, and the like. In some embodiments, it may be advantageous for the multi-axis deposition system to comprise a first print head that is comprises a microfluidic mixing nozzle and a second print head that does not comprise a mixing nozzle. As described elsewhere herein, in some embodiments, the print head may be configured to accept one or more material inputs (e.g., one material input, two material inputs, etc.). When two or more material inputs are present, the inputs may be substantially the same or they may differ.

A substrate in a multi-axis deposition system may be any suitable substrate capable of receiving the material deposited by the print head. In some cases, the substrate, or substrate support member, may have a shape that facilitates deposition of the material of interest in a morphology of interest by the print head. As an example, the substrate and/or substrate support may have a shape that substantially corresponds to the morphology of interest, such as a footwear last for footwear applications (e.g., as shown in FIG. 8), a bra cup for sports bra applications and/or for bra lining applications, an article substantially corresponding to the shape of a knee for knee brace applications, an article substantially corresponding to the shape of an ankle for ankle brace applications, an article substantially corresponding to the shape of a wrist for wrist brace applications, an article substantially corresponding to the shape of a shoulder for shoulder brace applications, and/or an article substantially corresponding to the shape of an arm for arm band applications. As another example, the substrate may be a mold or a portion of a mold. As a third example, the substrate may comprise a portion that is curved, and/or the substrate as a whole be curved. For instance, the substrate may have a spherical shape, or a hemispherical shape. As a fourth example, the substrate may comprise two or more surfaces that are joined at facets. In some such cases, the substrate may be a platonic solid or may comprise a portion that is a platonic solid. In some embodiments, the substrate may be substantially flat. Other types of substrates are also possible.

In some embodiments, a multi-axis deposition system may comprise a substrate that is removable. The substrate may be configured to be positioned in the multi-axis deposition system during material deposition and removed after material deposition. In some embodiments, a multi-axis deposition system may comprise multiple substrates that may be added to the multi-axis deposition system prior to material deposition and/or removed from the multi-axis deposition system after material deposition. Each substrate and/or substrate support member may have a different shape (e.g., a different shoe size, a different cup size, a mold for a different type of apparel), or two or more substrates may have substantially the same shape.

As described above, one or more articles or substrates may be disposed on the substrate support member prior to material deposition and/or during material deposition using a multi-axis deposition system. The article(s) disposed on the substrate support may be configured to be positioned on the substrate support during material deposition and, optionally, removed from the substrate support after material deposition. In some embodiments, a multi-axis deposition system may be configured to deposit material onto a multiple articles successively, each of which may be added to the multi-axis deposition system prior to material deposition and/or removed from the multi-axis deposition system after material deposition. For example, a textile (e.g., a non-flat textile, an upper, a woven textile, a knit textile) may be disposed on the substrate support prior to material deposition, during material deposition, and/or after material deposition. In some embodiments, a multi-axis deposition system may be employed to deposit a reactive mixture as described above onto a textile to form a 3D-printed material on the textile and/or on a succession of textiles sequentially added to the substrate support.

It should be noted that the print head(s) and the substrate in a multi-axis deposition system comprising both a print head and a substrate and/or substrate support may be oriented with respect to each other in other ways than that shown in FIG. 8. As an example, a print head may be disposed over the center of the substrate in some embodiments and over the edge of the substrate in other embodiments. As another example, a print head may be oriented so that it deposits material on the substrate at a 90° angle to the substrate in some embodiments and so that it deposits material on the substrate at another angle to the substrate (e.g., 45°, 30°, or other angles) in other embodiments. As a third example, the substrate may present a bottom surface (e.g., a portion of a last on which a sole would be disposed) to a print head in some embodiments and may present a side or top surface (e.g., a portion of a last on which an upper would be disposed) in other embodiments. In some cases, the print head(s) and/or the substrate may be configured to be translated and/or rotated around one or more axes, as described further below. In such cases, the absolute positions of the print head(s) and the substrate may be varied during operation of the multi-axis system, and/or the relative position of the print head(s) with respect to the substrate may be varied during operation of the multi-axis system.

As described above, a multi-axis deposition system may comprise one or more print heads that may be configured to be translated along one or more axes. In some embodiments, one or more print heads may be configured to be translated along one axis, along two axes, or along three axes. In certain cases, the axes may be perpendicular to each other. In other cases two or more of the axes are not perpendicular to each other (e.g., they may intersect at an angle between 45° and 90°). For example, in some embodiments the print head may be configured to be translated vertically, and/or translated in one or more directions perpendicular to the vertical direction. As another example, in some embodiments one or more print heads may be configured to be translated in a direction perpendicular to the substrate, and/or in one or more directions parallel to the substrate. As a third example, in some embodiments one or more print heads may be configured to be translated at a 45° angle with respect to the substrate. In some cases, each axis of translation may independently be controlled by separate motors. In some embodiments, one or more print heads may not be configured to be translated.

In some embodiments, one or more print heads in a multi-axis system may be configured to be rotated around one axis, around two axes, or around three axes. In some embodiments, one or more print heads may be configured to be rotated around more than three axes (e.g., around more than four axes, around more than six axes, around more than eight axes, around more than 10 axes, or around more than 12 axes). In certain cases, the axes may be perpendicular to each other. For example, in some embodiments the print head may be configured to be rotated around a vertical axis, and/or rotated around one or more axes perpendicular to the vertical axis. As another example, in some embodiments one or more print heads may be configured to be rotated around an axis perpendicular to the substrate, and/or around one or more axes parallel to the substrate. In some cases, each axis of rotation may independently be controlled by separate motors. In some embodiments, one or more print heads may not be configured to be rotated. In some embodiments, the print head may be configured to be stationary.

In some embodiments, a substrate in a multi-axis system may be configured to be translated along one axis, along two axes, or along three axes. In certain cases, the axes may be perpendicular to each other. In other cases two or more of the axes are perpendicular to each other (e.g., they may intersect at an angle between 45° and 90°). For example, in some embodiments the substrate may be configured to be translated vertically, and/or translated in one or more directions perpendicular to the vertical direction. As another example, in some embodiments the substrate may be configured to be translated in a direction perpendicular to the print head, and/or in one or more directions parallel to the print head. As a third example, in some embodiments the print head may be configured to be translated at a 45° angle with respect to the substrate. In some cases, each axis of translation may independently be controlled by separate motors. In some embodiments, the substrate may not be configured to be translated.

In some embodiments, a substrate in a multi-axis system may be configured to be rotated around one axis, around two axes, or around three axes. In certain cases, the axes may be perpendicular to each other. In some embodiments, the substrate may be configured to be rotated around more than three axes (e.g., around more than four axes, around more than six axes, around more than eight axes, around more than 10 axes, or around more than 12 axes). For example, in some embodiments the substrate may be configured to be rotated around a vertical axis, and/or rotated around one or more axes perpendicular to the vertical axis. As another example, in some embodiments the substrate may be configured to be rotated around an axis perpendicular to the print head, and/or around one or more axes parallel to the print head. In some cases, each axis of rotation may independently be controlled by separate motors. In some embodiments, the substrate may not be configured to be rotated. In some embodiments, the substrate may be configured to be stationary.

In some embodiments, a multi-axis deposition system may comprise one or more features that aid rotation and/or translation of a print head and/or a substrate. As an example, in some cases the print head may be attached to a print head arm that facilitates motion. When two or more print heads are present, each print head may be positioned separate print head arms or two or more print heads may be positioned on the same print head arm. In some cases, two or more print head arms may be attached to a single gantry. The print head arms may be capable of facilitating translation and/or rotation of the print head. In some embodiments, the print head(s) may be attached to single print head arms; in other embodiments, the print head(s) may be attached to multiple print head arms that are attached at joints that facilitate rotation and/or translation. In some cases, one or more motors may facilitate motion of one or more components of the print head arm(s). As another example, in some cases the substrate may be attached to a substrate arm that facilitates motion. The substrate arm may be capable of facilitating translation and/or rotation of the substrate. In some embodiments, the substrate may be attached to a single substrate arm; in other embodiments, the substrate may be attached to multiple substrate arms that are attached at joints that facilitate rotation and/or translation. In some cases, the substrate may be attached to a robot arm. In some cases, one or more motors may facilitate motion of one or more components of the substrate arm(s). In certain embodiments, the print head may be attached to a print head arm and the substrate may be attached to a substrate arm.

Figure 9:
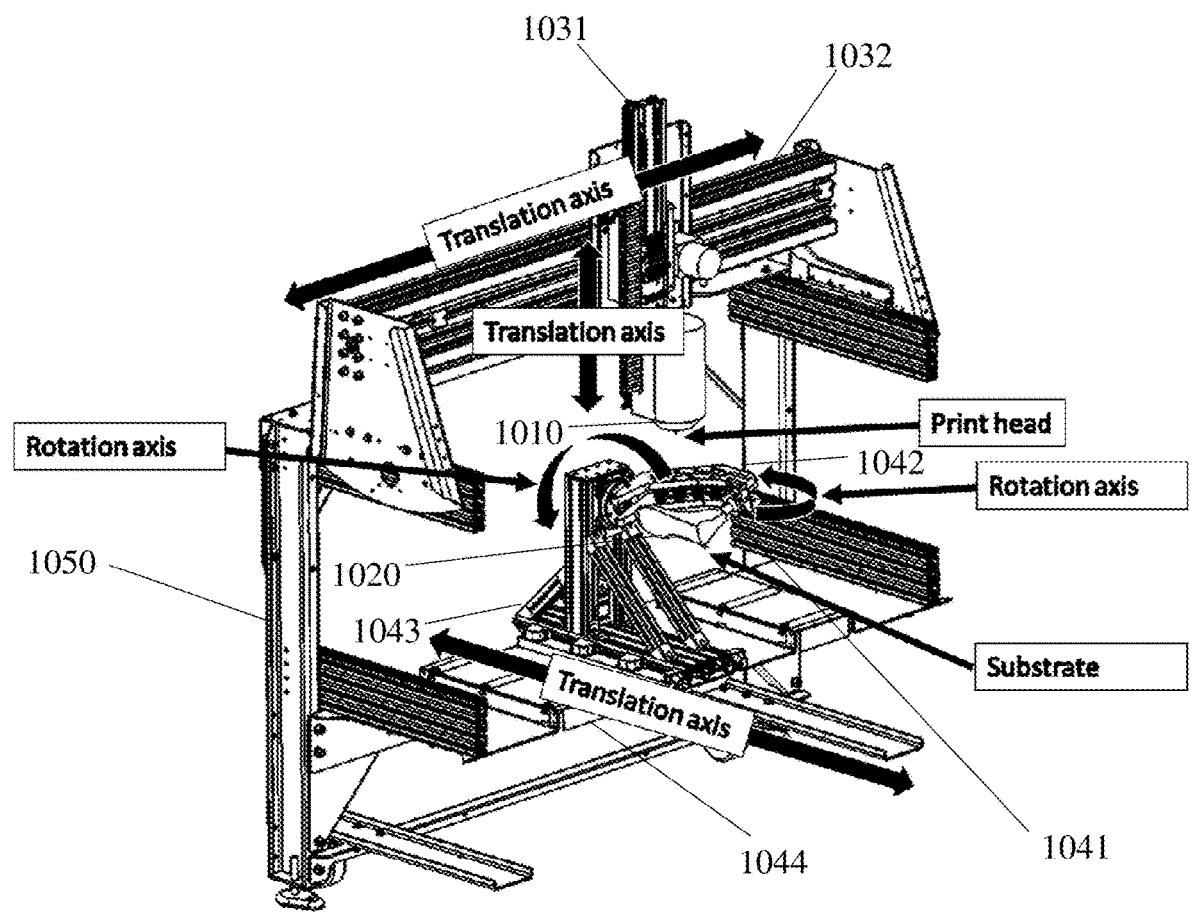
FIGS. 9-11 are schematic depictions of a multi-axis deposition system, according to certain embodiments of the invention.
Figure 10:
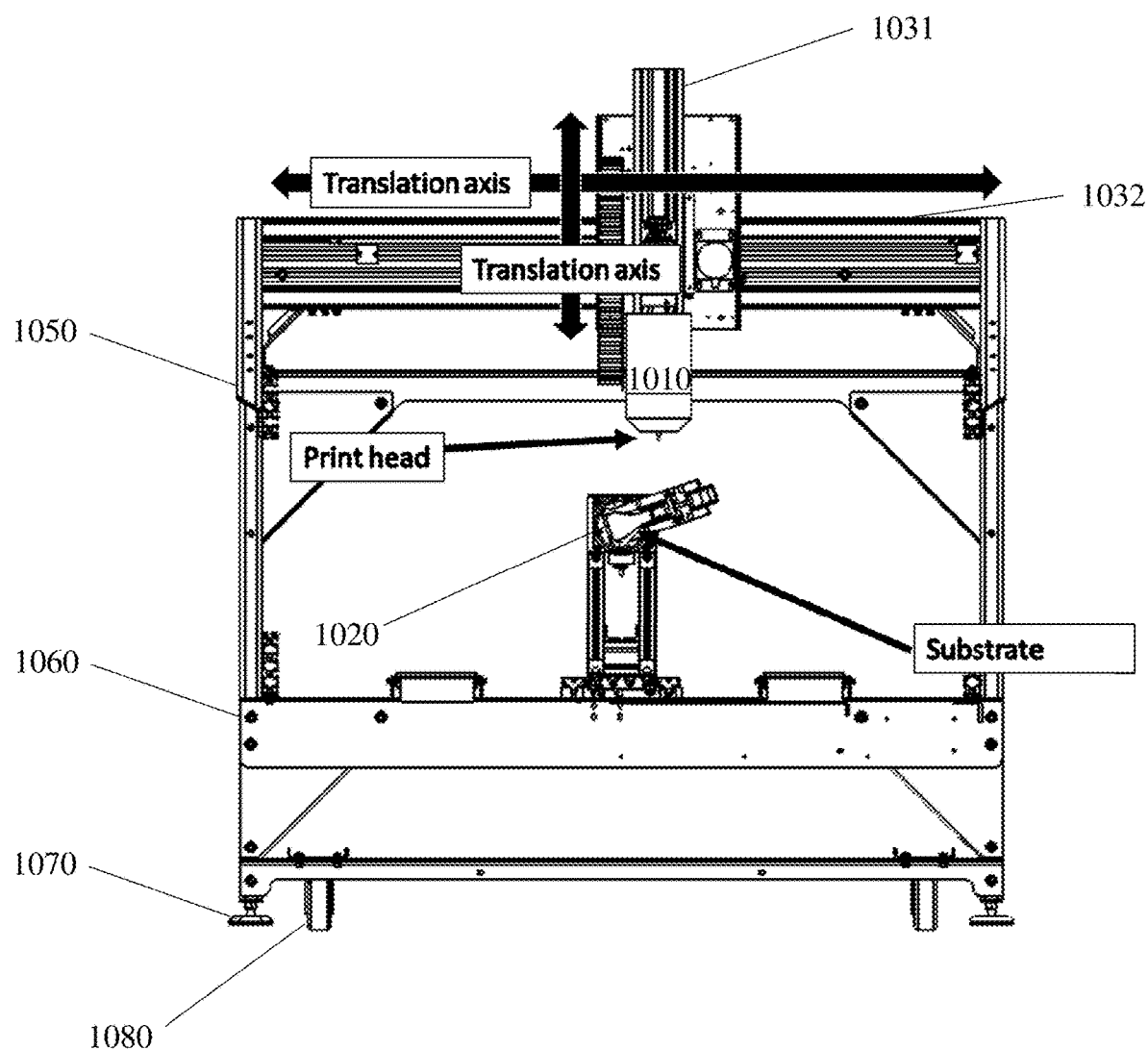
Figure 11:
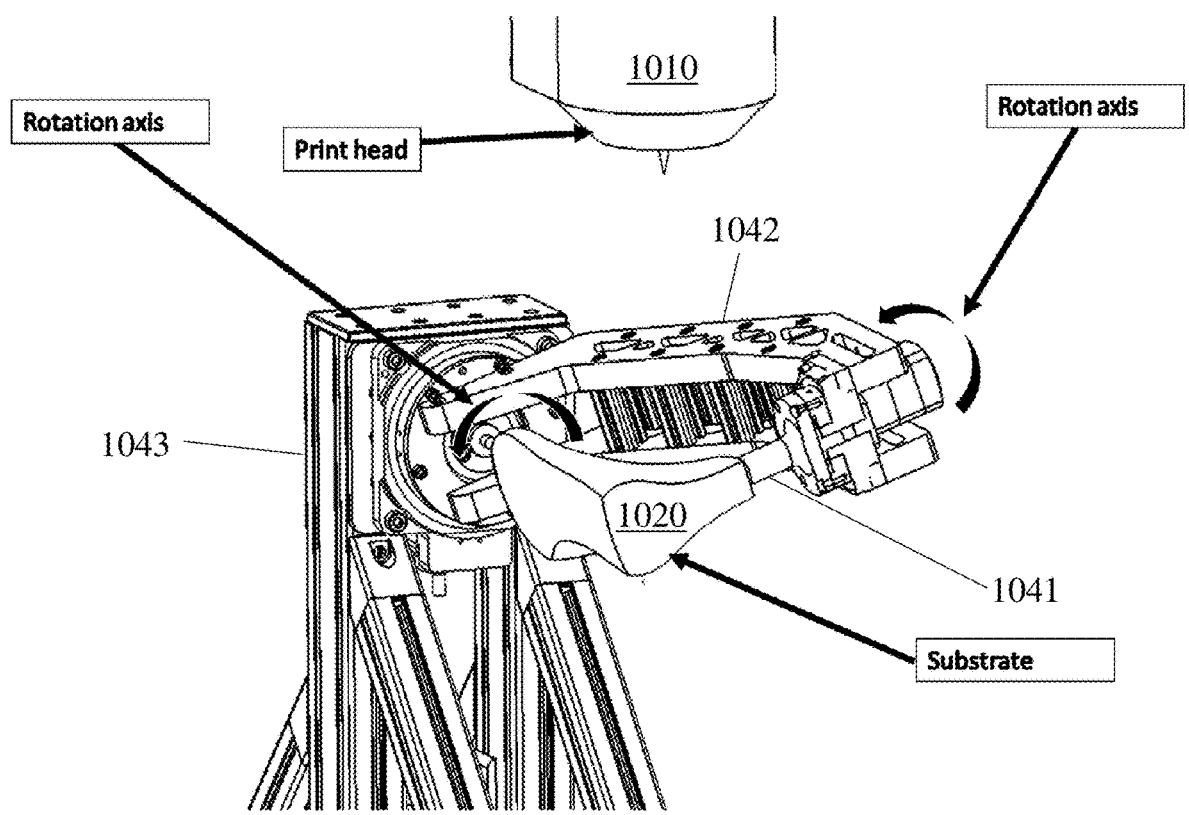

FIGS. 9-11 show various views of a non-limiting embodiment of a multi-axis deposition system showing various combinations of axes around which a print head and substrate therein may be configured to be rotated and/or translated. FIG. 9 shows a perspective view of the system as a whole, FIG. 10 shows a cross-sectional view of the system as a whole, and FIG. 11 shows a close up perspective view of the print head and the substrate. It should be understood that these figures do not show all possible combinations of print head and substrate motion, and that all combinations of print head motion and substrate motion described above are contemplated.

In FIGS. 9-11, the multi-axis deposition system includes print head 1010 and substrate 1020. Print head 1010 in FIGS. 9-11 is attached to first print head arm 1031, which is attached to second print head arm 1032 by a first print head joint configured to facilitate translation of first print head arm 1031 along a first print head translation axis and along a second print head translation axis. Second print head arm 1032 is also attached to gantry 1050, which supports the second print head arm. In some embodiments, the second print head arm is attached to the gantry by screws and held in a stationary position (as is shown in FIGS. 9-11). In other embodiments, the second print head arm is configured to be translated along one or more axes and/or rotated around one or more axes. The print head may be translated along the first print head translation axis by translating the first print head arm along the first print head translation axis, and the print head may be translated along the second print head translation axis by translating the first print head arm along the second print head translation axis. In certain cases, such as that shown in FIGS. 9-11, the second print head arm may be a track along which the first print head arm may be translated and/or the first print head joint may comprise a track along which the first print head arm may be translated. In other embodiments, other types of joints and print head arms may be employed.

Substrate 1010 in FIGS. 9-11 is attached to first substrate arm 1041, which is attached to second substrate arm 1042 by a first substrate joint configured to facilitate rotation of first substrate arm 1041 around a first substrate rotation axis. Second substrate arm 1042 is attached to third substrate arm 1043 by a second substrate joint configured to facilitate rotation of second substrate arm 1042 around a second substrate rotation axis. The substrate may be rotated around the first substrate rotation axis by rotating the first substrate arm around the first substrate rotation axis, and around the second substrate rotation axis by rotating the second substrate arm around the second substrate rotation axis. In some embodiments, one or more of the substrate arms may curved (e.g., second substrate arm as shown in FIGS. 9-11). Third substrate arm 1043 is attached to support 1044 by a third substrate joint configured to facilitate translation of the third arm along a first substrate translation axis. The substrate may be translated along the first substrate translation axis by translating the third arm along the first substrate translation axis. In certain cases, such as that shown in FIGS. 9-11, the third substrate arm may be a track along which the second substrate arm may be translated. In other embodiments, other types substrate arms may be employed.

In some embodiments, a multi-axis system may comprise further features in addition to some or all of those described above. For example, the multi-axis system may be encased in a frame or enclosure. FIG. 10 includes frame 1060 with feet 1070 and wheels 1080. The feet may aid stable positioning of the frame on a surface (e.g., a floor, a desktop, a lab bench). The wheels may promote facile repositioning of the frame in different locations. In some embodiments, one or more components (e.g., the frame, one or more arms) may be formed from standardized parts, such as T-slotted framing. Other types of standardized parts, and/or non-standard parts, may also be employed.

Certain combinations of print head motion and substrate motion may be especially advantageous. For example, as shown in FIGS. 9-11, a print head may be configured to be translated vertically and in a first horizontal direction, and the substrate may be configured to be translated along a second horizontal direction perpendicular to the first horizontal direction and rotated around two distinct axes. As another example, a print head may be configured to be translated in three perpendicular directions and the substrate may be configured to be rotated around two distinct axes. As a third example, a print head may be configured to be stationary and the substrate may be configured to be translated in three perpendicular directions and rotated around two distinct axes. As a fourth example, a print head may be configured to be translated around three distinct rotation axes and along three distinct translation axes, and the substrate may be configured to be stationary. Other combinations of print head motion and substrate motion are also possible.

In some embodiments, a multi-axis system may have one or more features that make it suitable for 3D-printing materials of interest. For example, the multi-axis system may be configured to deposit a material onto a substrate as a continuous stream or as a continuous filament. In other words, the substrate may be in fluid communication with the print head via the material during deposition. In certain cases, the multi-axis system may be employed to deposit a continuous stream or filament that extends from a first side of a last or a material disposed on the last (e.g., an upper, a 3D-printed material disposed on an upper) across the bottom of the last or material disposed on the last to the opposing side of the last or material disposed on the last. In some cases, the multi-axis system may be employed to print each portion of an article of footwear except for the upper.

In some embodiments, a multi-axis system may be configured to 3D-print materials with one or more advantageous properties. For example, the multi-axis system may be configured to 3D-print materials with a feature size of greater than or equal to 100 microns, greater than or equal to 200 microns, greater than or equal to 500 microns, greater than or equal to 1 mm, greater than or equal to 2 mm, greater than or equal to 5 mm, greater than or equal to 10 mm, greater than or equal to 20 mm, greater than or equal to 50 mm, greater than or equal to 1 cm, or greater than or equal to 2 cm. In some embodiments, the multi-axis system may be configured to 3D-print materials with a feature size of less than or equal to 5 cm, less than or equal to 2 cm, less than or equal to 1 cm, less than or equal to 5 mm, less than or equal to 2 mm, less than or equal to 1 mm, less than or equal to 500 microns, or less than or equal to 200 microns. Combinations of the above-referenced ranges are also possible (e.g., greater than or equal to 100 microns and less than or equal to 5 cm). Other ranges are also possible.

As discussed herein, a 3D printer may be provided that is capable of printing a material (e.g., a polymeric material, a composite) that is formed by combining two or more other thermoplastic materials to create a 3D object, such as an article of a shoe. Additionally (or alternatively), such 3D objects may comprise a gradient structure with at least one non-uniform property (e.g., color, stiffness, Shore A hardness, average pore size, and density). The inventors have appreciated that existing techniques for generating printer instructions for a 3D printer, such as those implemented in conventional slicer software applications, may be unable to accurately determine appropriate printer settings (e.g., a ratio of two or more inputs to a mixing chamber and/or nozzle, a spin speed of an impeller in the mixing nozzle, sequencing of material into a mixing chamber and/or nozzle, and valving to change material inputs into the mixing chamber and/or nozzle, total cumulative flow rate of all inputs to a mixing chamber, vertical position of a print head relative to the substrate, speed of movement of the print head, amount of reverse pumping following a movement command, temperature of the print head, temperature of a substrate onto which the article is printed, and the calibration setting for a material inlet pump) to properly print such materials. Accordingly, aspects of the present disclosure relate to a computer program that is configured to generate printer settings for printing such materials in uniform and/or gradient structures of a 3D object.

The computer program may be configured to receive object information, such as a design file for a 3D object (e.g., from a computer-aided design (CAD) program) and/or a print path for printing a 3D object (e.g., from a slicer application) with information indicative of target material properties at various points along the print path, and output print instructions that may be provided to a 3D printer to accurately create the 3D object. The computer program may generate the print instructions by, for example, identifying a target material that is to be deposited, identifying the input materials required to create the target material, and identifying the printer settings to print the target material using the input materials. Once the appropriate set of printer settings have been identified, print instructions may be generated using the identified set of printer settings. For example, print instructions may be generated that comprise a print path for the print head to follow and printer settings information indicative of the appropriate printer settings at a plurality of points along the print path.

Figure 12:
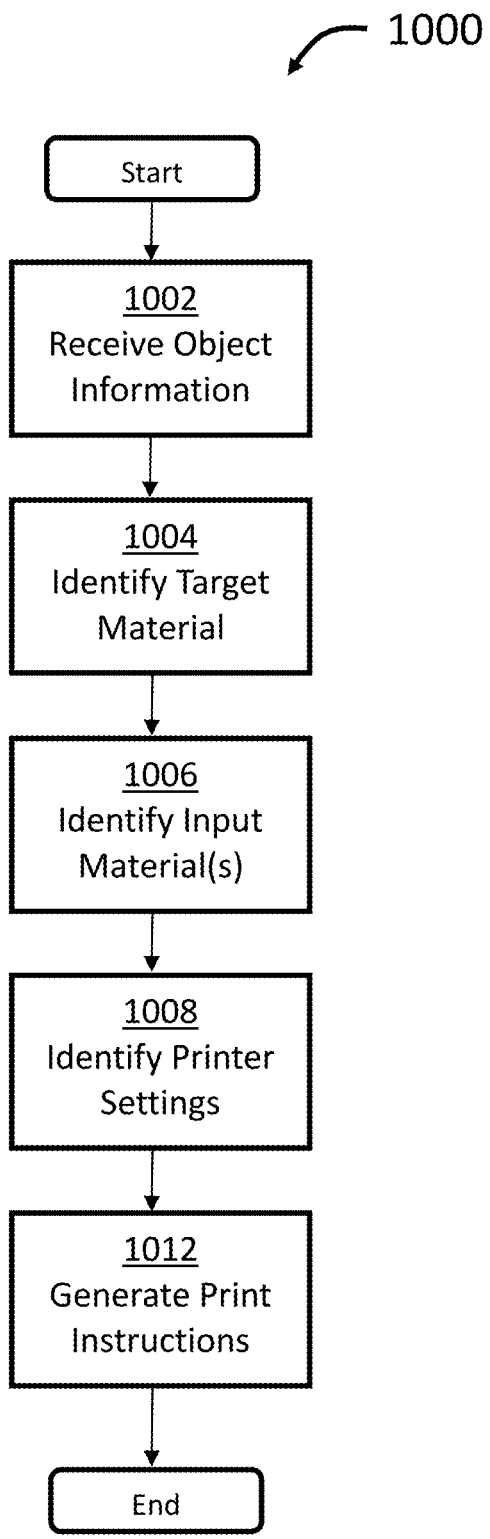
FIG. 12 is a non-limiting flow diagram of a method for generating print instructions from object information, in accordance with some embodiments of the invention.

In some embodiments, the computer program may comprise a plurality of instructions that program at least one processor to perform a method 1000 in FIG. 12. As shown, the method 1000 comprises an act 1002 of receiving object information, an act 1004 of identifying target material to be printed, an act 1006 of identifying input materials to form the target material, an act 1008 of identifying printer settings to print the target material, and an act 1012 of generating print instructions.

In act 1002, the system may receive object information associated with a 3D object. The object information may be, for example, a design file for a 3D object to be printed. For example, the object information may comprise a print path comprising a plurality of points and metadata associated with one or more (or all of) the plurality of points indicative of a desired material property at the point (e.g., color, stiffness, Shore A hardness, average pore size, density, nanoindentation hardness, etc.). In some implementations, the metadata may be directly associated with one or more points in the plurality of points. In other implementations, the metadata may be stored in another format and overlaid onto the print path to determine the material properties at a given point. For example, the metadata may be desired color information stored in an image comprising a plurality of pixel values that may be overlaid onto the print path. In this example, the pixel value that aligns with a given point in the print path may be the metadata associated with the respective point.

In act 1004, the system may identify a target material to be printed based on the object information. For example, the object information may comprise information regarding the target material (e.g., in metadata) and the system may directly identify the target material from the received object information.

In act 1006, the system may identify input material(s) to create the target material. For example, the 3D printer may print the target material in the object by mixing a first material with a second material. In this example, the system may identify the first and second materials. The system may identify this information by, for example, retrieving information stored in a memory of the computer system regarding the input materials required to create the target material in the object.

In act 1008, the system identifies one or more printer settings for printing the target material using the identified input materials. In some embodiments, the system may identify one or more printer settings required to print the target material at a plurality of discrete points in the object (e.g., along the print path). In instances where the printer settings deviate between discrete points (e.g., to print a gradient structure in the object), the system may employ interpolation techniques (e.g., linear interpolation and cubic interpolation) to smooth shifts in printer settings between the discrete points. In one example for illustration, the system may identify that the mixing ratio of two materials needs to be 40/60 at a first point in a gradient structure and a 50/50 ratio at a second point in the gradient structure. In this example, the system may fit a linear curve between the first and second points to create a smooth ramp between a 40/60 ratio and a 50/50 ratio. Thereby, the system may create a set of printer settings to employ along the print path as the print head moves from the first point to the second point.

In act 1012, the system may generate the print instructions using the identified printer settings in act 1008. The print instructions may comprise, for example, a print path for a print head to follow to print the 3D object along with printer settings at a plurality of points along the print path (e.g., generated in act 1008). The print instructions may be, for example, G-code instructions. Once the print instructions have been generated, the system may transmit the print instructions to a 3D printer (and/or one or more other components of a 3D printer in embodiments where the computer system is integrated with the 3D printer).

In one set of embodiments, a nozzle is used to direct a material (e.g., a precursor) onto a substrate. The nozzle can have any suitable shape. The nozzle may have any suitable shape having an outlet able to direct material at a substrate. For instance, the nozzle may be conical, pyramid-shaped, funnel-shaped, cylindrical, or the like. The nozzle may also have any suitable size. In some cases, the nozzle may include one or more mixing chambers or other regions in which two fluids come into contact with each other, and can be mixed together, e.g., actively or passively. The nozzle or the mixing chamber may have a volume that is less than 20 ml, less than 18 ml, less than 16 ml, less than 14 ml, less than 12 ml, less than 10 ml, less than 8 ml, less than 6 ml, less than 5 ml, less than 4 ml, less than 3 ml, less than 2 ml, less than 1 ml, less than 0.5 ml, less than 0.3 ml, less than 0.1 ml, etc., and/or a volume that is at least 0.1 ml, at least 0.3 ml, at least 0.5 ml, at least 1 ml, at least 2 ml, at least 3 ml, at least 4 ml, at least 5 ml, at least 6 ml, at least 8 ml, at least 10 ml, at least 12 ml, at least 14 ml, at least 16 ml, at least 18 ml, at least 20 ml, etc.

In addition, fluids may be introduced into the nozzle, and product produced within the nozzle, at relatively high rates. For example, in certain embodiments, the rate of printing of product may be at least 0.1 mL/min, at least 0.3 mL/min, at least 0.5 mL/min, at least 1 mL/min, at least 3 mL/min, at least 5 mL/min, at least 10 mL/min, at least 30 mL/min, at least 50 mL/min, at least 100 mL/min, at least 300 mL/min, at least 500 mL/min, at least 1 L/min, at least 3 L/min, at least 5 L/min, at least 10 L/min, or at least 20 L/min. In some cases, the rate of printing may be no more than 25 L/min, no more than 20 L/min, no more than 15 L/min, no more than 10 L/min, no more than 5 L/min, no more than 3 L/min, no more than 1 L/min, no more than 500 mL/min, no more than 300 mL/min, no more than 100 mL/min, no more than 50 mL/min, no more than 30 mL/min, no more than 10 mL/min, no more than 5 mL/min, no more than 3 mL/min, no more than 1 mL/min, no more than 0.5 mL/min, no more than 0.3 mL/min, or no more than 0.1 mL/min. Combinations of any these are also possible, e.g., the rate of printing may be between 0.1 mL/min and 20 mL/min. It should also be understood that each pump controlling the above printing flow rates may account for the full flow rate or a small portion of it, and the ratio may change over time. As a non-limiting example, a print head comprising a microfluidic printing nozzle with three pumps printing at 10 mL/min may have a first pump with an initial flow rate of 2 mL/min, a second pump with an initial flow rate of 5 mL/min, and a third pump with an initial flow rate of 3 mL per min. Later in the print, the print head may still be printing at a flow rate of 10 mL/min, but the first pump may have a final flow rate of 5 mL/min, the second pump may have a final flow rate of 5 mL/min, and the third pump may have a final flow rate of 0 mL/min. Any individual pump may have a flow rate that ranges from 0 mL/min to 20 L/min at any point within a print. In addition, as discussed above, a fluid may contain particles (e.g., reinforcing particles) in some cases. In some cases, particles such as reinforcing particles can be introduced into the nozzle, e.g., without the presence of a fluid. For example, the particles (e.g., reinforcing particles) may enter the nozzle in a substantially dry state in certain embodiments.

Relatively small volumes such as these may be useful in certain embodiments to promote more complete mixing, e.g., such that the fluids and/or solids are substantially mixed together, and/or to promote smaller residence times within the mixer, for example, less than 30 s, less than 25 s, less than 20 s, less than 15 s, less than 10 s, or less than 5 s. In addition, relatively small volumes may be useful to more rapidly stop and/or alter the properties of the mixture that is extruded from the nozzle.

As mentioned, in certain embodiments of the invention, the nozzle may include a valve, such as a needle valve. In some cases, a valving system may be used to control fluid input into the nozzle and/or material exiting the nozzle. In certain instances, various components of the mixing system that come in contact with the material may be set up with a valving system.

The fluids and/or particles (if present) may be mixed until they are substantially mixed together in certain embodiments, e.g., having a relatively uniform appearance, or are substantially homogenous mixed. For instance, the fluids and/or particles (if present) may be mixed such that the individual fluids are evenly distributed relative to each other (e.g., upon exiting the nozzle). In some cases, after mixing, portions of the exiting mixture do not exhibit large or changing variations in relative distributions or ratios of one fluid relative to other fluids. However, in other cases, the fluids and/or particles (if present) may only be partially mixed together. In some cases, mixing within the nozzle may be passive, e.g., where the flow of fluids and/or particles (if present) into the nozzle causes the mixing of the fluids and/or particles within the nozzle. The nozzle may also contain, in some embodiments, baffles or other impediments to disrupt the flow of fluid and/or particles, e.g., to promote mixing.

In some embodiments, material exiting the nozzle may pass through an opening which structures the printed line (e.g. continuously printing) or dose (e.g. dosing mode). The opening can be one of a variety of geometries including, but not limited to, circular, rectangular, star-shaped, any closed two-dimensional shape, multiple separate shapes (e.g., being fed from the same nozzle), or the like.

In addition, in some embodiments, the nozzle, mixing chamber, and/or the impeller may be at least partially coated with a non-stick surface to prevent material from building up on such surfaces. Examples of suitable coatings include, but are not limited to, polymeric coatings such as PTFE, metal coatings such as electroless deposited nickel coatings, carbon coatings (e.g., comprising or consisting of graphite, graphene, and/or carbon nanotubes), ceramic coatings, and composite coatings of any of the above.

Figure 5:
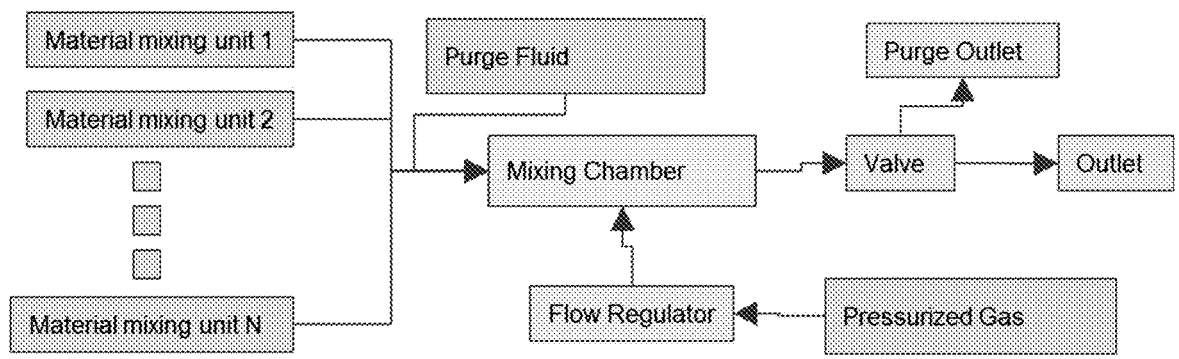
FIG. 5 illustrates an example nozzle architecture, in still another embodiment of the invention.
Figure 6:
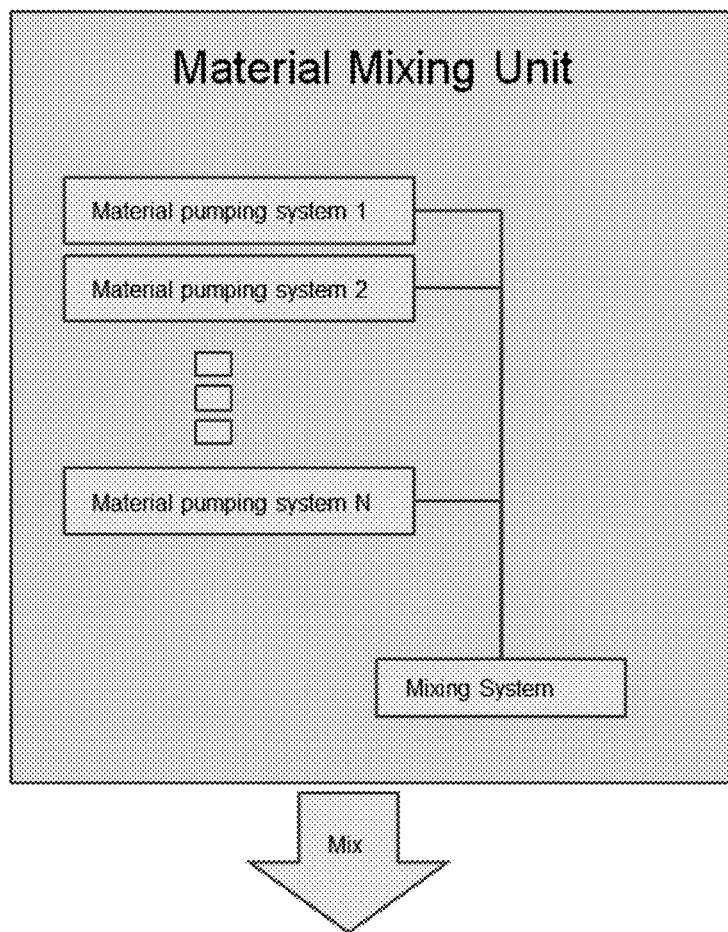
FIG. 6 illustrates an example material mixing unit architecture, in another embodiment of the invention.

One non-limiting example of an architecture for a nozzle can be seen in FIG. 5. In this figure, a plurality of mixing units may be used to mix various fluids, and such mixtures, and/or a purge fluid, may be combined within a mixing chamber (e.g., within a nozzle), along with gas (for example, from a suitable source, such as a pressurized gas tank, controlled using a flow regulator, a valve, or another suitable system. The mixing chamber and nozzle may be heated and/or cooled. The product, after mixing, may be controllably released through a valve to an outlet, and/or purged (for example, when different materials are mixed, as discussed herein). An example of a material mixing unit can be seen in FIG. 6. A plurality of different pumping systems may be used to combine two or more fluids together within a mixing unit.

Figure 7A:
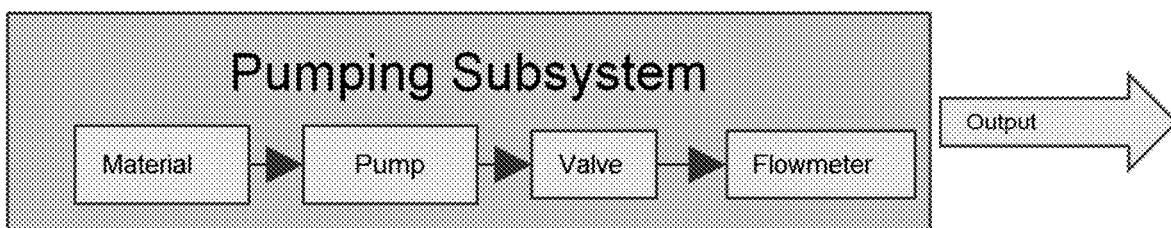
FIGS. 7A-7B illustrate examples of architectures for various subsystems in certain embodiments of the invention.
Figure 7B:
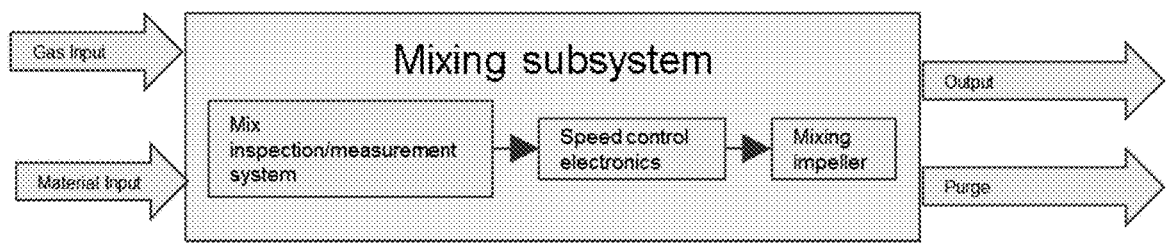

Examples of architectures for various subsystems in certain embodiments of the invention can be seen in FIG. 7. In FIG. 7A, an example architecture for a pumping subsystem is shown. Material may be controlled by a pump and/or a valve, and optionally monitored by a flowmeter or other suitable sensor, e.g., as discussed herein. FIG. 7B illustrates the architecture for a mixing chamber. This may include, for example, one or more inputs (e.g., a gas input or a fluid input), various sensors to for example, inspect or measure mixing, a controller to control the impeller, e.g., the speed and/or position, etc., which may lead to one or more outputs, e.g., a material output and a purge output.

It should be noted that these architectures are by way of example only, and in other embodiments, other architectures may be used, for example, for nozzles, mixing chambers, pumping subsystems, or the like.

In addition, in some embodiments, the composition or one or more of the fluids and/or particles (if present) may be changed during the mixing process, e.g., to produce a change or a gradient in properties in the product. For example, the ratio of two inputs may be changed during mixing, or one input may be replaced with another input during mixing, etc. In some cases, a first fluid may be changed to a different fluid in a continuous manner, e.g., without interruption. As another non-limiting example, particles (e.g., reinforcing particles) may be added to the nozzle and/or to a fluid entering the nozzle, and changed to different particles (e.g., reinforcing particles), e.g., without interruption.

Non-limiting examples of properties that may change within a product include pore or cell size, density, stiffness, hardness, degree of cross-linking, chemical composition, or the like. The change may be a step change, or a more gradual change, e.g., producing a gradient in a property. For example, a foam or other product may exhibit a first portion having a first property (e.g., average pore size) and a second portion having a second property. Thus, for example, the product may have a first average pore size and a second portion that solidifies into a foam having a second average pore size, wherein the first average pore size is at least 10%, at least 20%, at least 30%, at least 40%, at least 50%, etc. greater than the second average pore size. There may be a gradual or abrupt change between the portions. Other examples of properties that may change within a product include, but are not limited to, average largest dimension of particles (e.g., reinforcing particles), average concentration of particles (e.g., reinforcing particles), surface roughness, compression strength, slip resistance, and abrasion resistance.

As used herein, a portion of an article may refer to any collection of points within the article (i.e., points that are within the portion of space bounded by the external surfaces of the article). Portions of the article are typically, but not always, volumes of space within the article (in some embodiments, a portion may be a surface within an article, a line within an article, or a point within an article). Portions of the article may be continuous (i.e., each point within the portion may be connected by a pathway that does not pass through any points external to the portion) or may be discontinuous (i.e., the portion may comprise at least one point that cannot be connected to at least one other point within the article by a pathway that does not pass through any points external to the portion). Portions of an article may be substantially homogeneous with respect to one or more properties (e.g., one or more properties of the portion may vary with a standard deviation of less than or equal to 1%, 2%, 5%, or 10% throughout the portion), and/or may be heterogeneous with respect to one or more properties (e.g., one or more properties of the portion may vary with a standard deviation of greater than or equal to 1%, 2%, 5%, or 10% throughout the portion).

In some embodiments, one or more properties of a mixture that is 3D-printed from a nozzle may change as a function of time and/or nozzle position with respect to the substrate. For instance, the composition of one or more components and/or the wt % of one or more components within the mixture may change as a function of time. In some embodiments, one or more physical parameters of the nozzle and/or the substrate may change as a function of time. As an example, the temperature of the nozzle and/or the substrate may change as a function of time. Without wishing to be bound by theory, the temperature of the nozzle and the temperature of the substrate may affect the viscosity of the mixture, and/or the adhesion to the substrate. This may in turn affect the chemical structure of the mixture (e.g., the composition of the mixture, the degree of cross-linking of the resultant foam) during and/or after printing, and/or affect one or more physical properties of the mixture (e.g., the viscosity of the mixture, the average pore size of the resultant foam, the density of the resultant foam, the stiffness of the resultant foam, the hardness of the resultant foam) during and/or after printing. In some embodiments, changes in substrate or nozzle temperature during printing may facilitate different portions of the 3D-printed article (e.g., those printed at different times and/or in different positions on the substrate) to have different chemical or physical properties. In some embodiments, the portions with different chemical and/or physical properties may be printed in a single continuous process, and/or may together form a single integrated material.

In one set of embodiments, active mixing processes may be used to mix the fluids. For example, an impeller or other mixing apparatus may be used to mix fluids within the nozzle, e.g., in a mixing chamber within the nozzle. (However, it should be understood that an impeller is not necessarily required in all embodiments.) The impeller, if present, may have any shape or size able to cause the mixing of fluids. For instance, the impeller may include one or more vanes, blades, propellers, paddles, holes, and/or cavities, or the like, which may be used to cause movement (e.g., spinning) of fluids within the nozzle. In one embodiment, an impeller may include internal channels that facilitate a gas or fluid to enter through the impeller into the mixing chamber or nozzle. For instance, the nozzle may include a spindle having one or more openings that facilitate gas or other fluids to be released.

In addition, the impeller may be fabricated out of any suitable material, e.g., metal, ceramic, a polymer, or the like. In some cases, the impeller itself may be 3D-printed. The impeller may be controlled using any suitable technique, e.g., by mechanically, electrically, and/or magnetically rotating the impeller. In some cases, more than one impeller or other mixing apparatus may be used. Non-limiting examples of other mixing apparatuses and techniques include turbines or the application of ultrasound or additional fluids into the nozzle.

In addition, in some cases, no impeller or other mixing apparatus is used; for example, passive mixing techniques, such as controlling channel geometries or input flows, may also be used. For instance, ratios and/or compositions of incoming fluids may be controlled to control mixing, e.g., within a nozzle or mixing chamber. Combinations of mixing systems may also be used in certain embodiments, including combinations of active systems, or combinations of active and passive systems, for example, including any of the active or passive systems described herein.

In some cases, an impeller (or other mixing apparatus) may sweep through the nozzle or the mixing chamber such that the closest distance between the impeller as it travels and the wall of the nozzle or mixing chamber is less than 10 mm, less than 5 mm, less than 3 mm, less than 1 mm, less than 0.5 mm, less than 0.3 mm, less than 0.1 mm, less than 0.05 mm, less than 0.03 mm, less than 0.01 mm, less than 0.005 mm, etc. In some cases, the impeller may come into contact with the wall, although in other cases, the impeller may be at least 1 mm, at least 3 mm, at least 5 mm, or at least 10 mm away from the wall as it travels. In some cases, the impeller or other mixing apparatus may be one that substantially conforms to the shape of the nozzle or the mixing chamber in which the impeller or other mixing apparatus is located. For instance, the impeller may, upon rotation, sweep through a volume that is at least 50%, at least 60%, at least 70%, at least 80%, at least 90%, or at least 95% of the volume of the nozzle or the mixing chamber.

The impeller, if used, may be rotated at any suitable speed. For example, the impeller may be rotated at a speed of at least 5 rpm, at least 10 rpm, at least 20 rpm, at least 30 rpm, at least 40 rpm, at least 50 rpm, etc. In some cases, much higher rotation speeds may be used, e.g., at least 100 rpm, at least 200 rpm, at least 300 rpm, at least 500 rpm, at least 750 rpm, at least 1000 rpm, at least 2000 rpm, at least 3000 rpm, at least 5000 rpm, at least 7500 rpm, or at least 10,000 rpm. Higher rpm speeds may be useful in certain embodiments to create a froth or a foam. In some (but not all) embodiments, the impeller may be rotated at an rpm speed that is at least 16 times the residency time of the material in the mixing chamber or the impeller (for example, if the residency time is 10 seconds, then the rpm speed may be at least 160 rpm).

In some cases, the impeller may be rotated at variable speeds. For instance, the impeller may be rotated at different speeds to control the formation or various properties of the foam or other product, and/or the impeller may be rotated to control the rate at which a material is deposited onto a substrate from the nozzle. In addition, in some cases, the impeller may be rotated at a speed that increases or decreases with respect to time. In some cases, changing the rotation speed of the impeller with respect to time may be used to alter a property of the foam or other product, e.g., from a first portion to a second portion. An example of a system that can be used to control the speed of the impeller can be seen in Int. Pat. Apl. Pub. No. WO 2016/164562, incorporated herein by reference.

In addition, in some embodiments, the impeller may be at least partially coated with a non-stick surface to prevent material build-up, as discussed herein.

In some cases, the impeller has a shape that facilitates the impeller to fill the majority of the volume of the mixing chamber, such that the mixing volume is relatively small. When the mixing volume is relatively small, the material may have a relatively short residency time in the mixer, and the material properties or gradient structures can be varied quickly. In some cases, the free volume of the mixing chamber or nozzle (i.e., the volume therein not occupied by the impeller) may be less than 20 ml, less than 18 ml, less than 16 ml, less than 14 ml, less than 12 ml, less than 10 ml, less than 8 ml, less than 6 ml, less than 5 ml, less than 4 ml, less than 3 ml, less than 2 ml, less than 1 ml, less than 0.5 ml, less than 0.3 ml, less than 0.1 ml, etc. Thus, for example, in some embodiments, the impeller has a conical shape, e.g., if the mixing chamber or nozzle has a conical shape. In addition, in some cases, the impeller may be positioned such that the impeller as it travels has a distance from the wall of the nozzle or mixing chamber as discussed herein.

In one set of embodiments, the position of the impeller can be controlled or altered, for example, before or during mixing. The impeller may be actuatable with respect to the position of the mixing chamber, e.g., such that the mixing volume can be changed at any point to account for variable flow rate, thus keeping the residency time in the mixing chamber constant. For example, an actuator or servo may be able to move the impeller laterally within the mixing chamber, or towards an outlet, for example, during mixing or rotation of the impeller. In addition, in some cases, the impeller speed can be varied, such that the material experiences a fixed number of impeller rotations per residency time in the mix chamber.

In certain embodiments, the impeller can be used as a valve. For example, the end of the impeller may be directed into the outlet of the nozzle to block and close the nozzle, thereby preventing or controlling flow out of the chamber. For instance, the impeller may be directed forward (into the outlet) to prevent flow, and/or moved various distances relative to the outlet to facilitate different flows of fluid out of the nozzle.

In one set of embodiments, the nozzle and/or the mixing chamber may be heated or cooled. In some cases, the temperature of mixing may be controlled, for instance, to facilitate uniform mixing, to facilitate reaction of fluids therein (e.g., to optimum preferred or desired temperature), to remove excess heat (e.g., contributed by a chemical reaction, the spinning of an impeller, etc.), or the like. Various methods can be used to add heat or remove heat from the nozzle or the mixing chamber. For example, a heat source may be positioned to deliver heat to the nozzle or mixing chamber, or to one or more fluids entering therein. Examples of heat sources include electrically resistive heaters, infrared light sources, or heating fluids (e.g., which can transmit heat using a heat exchanger or the like). In some cases, more than one heat source may be used. Similarly, a variety of cooling sources can be used in some embodiments to remove heat from the nozzle or mixing chamber. Non-limiting examples include Peltier coolers or cooling fluids (e.g., which can remove heat using a heat exchanger or the like). In some embodiments, some tubes and/or reservoirs that feed material to the pumps at the print head may be heated and/or cooled. This heating or cooling can be used to condition material inside of the tubes. Heating or cooling may prevent crystallization or phase separation of material in components of the system (e.g., tubes, mixing chamber). Heating or cooling may also facilitate processing of a wider range of materials that may be solid at room temperature.

Heating and/or cooling may, for example, be used to control mixing, melting, and/or reaction within the material, to keep the temperature at substantially the temperature of the surrounding environment (e.g., at room temperature), to prevent the surrounding environmental conditions and/or the heat generated by friction of the impeller and exotherm of the material curing from affecting the reaction or the printing parameters, or the like. In some cases, the temperature may be altered by at least 5° C., at least 10° C., at least 15° C., at least 20° C., at least 60° C. at least 100° C., at least 150° C., at least 200° C., at least 300° C., or by other ranges such as those discussed herein. In other embodiments, however, the temperature may be controlled or altered by no more than 20° C., no more than 15° C., no more than 10° C., no more than 5° C., etc. relative to the incoming fluids or the surrounding environmental conditions.

In addition, in some embodiments, one or more sensors may be present, e.g., within the nozzle or mixing chamber, within an outlet, within the substrate, or within sensing communication of the nozzle, mixing chamber, outlet, and/or substrate. Such sensors may be used to determine a property of the incoming fluids, the mixing process, and/or the exiting material (for example, the flow rate), e.g., qualitatively and/or quantitatively. In some cases, such information may be used to control the process, e.g., by controlling the flow of fluid into the nozzle or mixing chamber, the mixing speed (e.g., of an impeller), the flow exiting an outlet, the opening and closing of a valve at the outlet, or the like. Non-limiting examples include temperature sensors (e.g., thermocouples, infrared cameras, or the like), pressure transducers, photodiodes, colorimetric sensors, etc. In addition, more than one sensor can be used in some cases.

Fluid, or solid particles, or a semi-solid paste, may be introduced into the nozzle or mixing chamber from one, two, three, or more inputs, in one set of embodiments. The inputs may independently have the same or different distances from the outlet of the nozzle or mixing chamber. As an example, two inputs may be near the top of a nozzle or mixing chamber, e.g., to facilitate two fluids to mix, and additional inputs may be lower, e.g., to introduce additional components (for instance, additives) as the fluids flow down the mixing chamber. As various non-limiting examples, this may be useful to facilitate reactions to occur in a certain order, to build viscosity first before starting to foam, to mix surfactants before adding filler, to mix ingredients prior to adding a catalyst, or the like.

In some embodiments, one or more of the inlets may be controlled using one or more valves or other apparatuses. In some cases, the valves may be controlled using a computer or other controller, e.g., as discussed herein. Thus, for example, valves may be used to control flow into (and/or out of) the nozzle. In some cases, valves may be used to control the flow of fluids through channel intersections, e.g., to keep fluids from reacting or curing too early (e.g., by creating a cured skin at the interface of an inactive channel). Examples of valves that can be used include, but are not limited to, needle valves, ball valves, gate valves, butterfly valves, and the like. The valves can independently be controlled, e.g., by electrical actuation, pneumatic actuation, or the like. In addition, in some cases, an impeller (if present) may be used as a needle valve, e.g., in conjunction with an outlet, as discussed herein.

The entering fluid may be gas, a liquid, a viscoelastic material, and/or any other flowable or deformable material. In some cases, the fluid may also contain particles such as reinforcing particles, including those discussed above. In addition, the entering fluid may include combinations of any of these in certain embodiments. In some cases, two or more fluids may be mixed prior to delivery, e.g., as discussed in detail herein. However, in some cases, two or more fluids may not be mixed prior to delivery. For instance, two or more inlets into the nozzle or mixing chamber may be used to introduce two or more separate fluids. These fluids can then be mixed in the nozzle or mixing chamber.

The fluids may be delivered using any suitable technique, and the same or different techniques may be used to deliver different fluids. For instance, fluids may be delivered passively (i.e., by gravitational flow), or actively (for example, by using pumps such as progressive cavity pumps, auger pumps, gear pumps, or the like). In some embodiments, the fluids may delivered using input channels that may have features to create turbulent flow and/or to cause passive mixing, e.g., as fluid flows through the channels. This may be useful, for example, in causing some mixing (for example, of a fluid with an additive) in order to occur prior to entry into a nozzle or mixing chamber such as described herein. In some cases, as mentioned, the nozzle may also include particles such as reinforcing particles, which may be incorporated into the final product, e.g., as a composite material.

In some cases, active mixing may be used to control the delivery of different fluids and/or particles (if present). This may be useful, for example, for mixing fluids entering in at different flow rates (e.g., as in a 4:1 or 10:1 ratio), different viscosities, or the like. For example, in some cases, fluids that may be used include fluids that have relatively high viscosities, or viscoelastic solids that exhibit a yield stress, etc.

In one set of embodiments, a material (for example, a melted polymer mixture), when deposited onto a substrate, may have a variety of rheological properties. For instance, the material may be substantially fluid and able to flow, e.g., to conform a mold or other substrate to which it is deposited. In some cases, the material may have a viscosity of less than less than 200,000 cP, less than 100,000 cP, less than 50,000 cP, less than 25,000 cP, less than 10,000 cP, less than 5,000 cP, less than 1,000 cP, less than 500 cP, less than 300 cP, less than 100 cP, less than 50 cP, less than 30 cP, or less than 10 cP. In some cases any one of the materials may have a viscosity of greater than 200,000 cP. The materials may also have viscosities that vary based on temperature. The material may also be Newtonian or non-Newtonian. In other embodiments, however, the material may exhibit some degree of solidity or elasticity, e.g., having a non-zero yield stress, and/or by exhibiting at least some resistance to a distorting influence or deforming force that is applied to the material. In some cases, the material may be sufficiently solid as to be able to define or hold a shape. For instance, the material may be sufficiently solid such that it deforms from its original shape by less than 10% (by volume) after deposition on a substrate, e.g., within 30 seconds after printing onto the substrate. In some cases the materials may be solid at room temperature (e.g. 23° C.), but have viscosities of less than 200,000 cP at temperatures at least 10° C. above room temperature.

The substrate may be any suitable target for a material exiting a nozzle. In some cases, the substrate is planar, although in other cases, the substrate is non-planar. For instance, the substrate may be a mold (e.g., the mold of a shoe), to which a material may be introduced. In some cases, the material may be relatively fluid and able to conform to contours within the substrate (e.g., if the substrate is a mold). However, in other cases, the material may be relatively solid, e.g., having a defined shape, upon deposition onto the substrate, such as is discussed herein.

In some cases, the substrate may also be heated or cooled, e.g., to promote or inhibit a reaction, to cause solidification to occur, to keep the deposited material from cooling beyond a certain degree, or the like. In some cases, the temperature may be altered by at least 5° C., at least 10° C., or by other ranges such as those discussed herein. In some cases, the substrate may be heated to temperatures greater than 40 degrees Celsius, greater than 50 degrees Celsius, greater than 70 degrees Celsius, greater than 80 degrees Celsius, or greater than 100 degrees Celsius. Any method may be used to heat or cool the substrate. For example, heat or cooling sources may be used to apply heat or cooling to the substrate, the substrate may be contained within a heated or cooled environment, or a source of a heated or cooled fluid may be used to heat or cool the substrate, e.g., via a heat exchanger). In one embodiment, radiant light or infrared radiation may be applied to the substrate for heating. In another embodiment, the substrate may be outfitted with cartridge heaters, film heaters, or a printed circuit board configured to provide resistive heat. In another embodiment, the substrate may be heated through inductive heating.

Mixing within a mixing chamber may be relatively complete, or may be partial in some cases. In addition, in some cases, no mixing may occur in a mixing chamber, other than incidental mixing or diffusion (for example, as two fluids come into contact with each other). As noted above, more vigorous mixing can occur within the printing nozzle, which may lessen the need for complete mixing to occur upstream. However, in other embodiments, more complete mixing may occur within one or more mixing chambers upstream of the printing nozzle.

In some aspects, one or more purge fluids may be used to purge one or more of the inlets, outlets, nozzles, and/or mixing chambers, etc. For example, a purge fluid may be passed through one or more of these when they are not actively being used to mix or print, and/or to clear fluids so that different fluids can be used. For instance, a purge fluid may flow through an inlet when switching the inlet from a first fluid source to a second fluid source, e.g., to purge residual fluid from the first fluid source that may be present. The purge fluid may flow through the nozzle in some cases, and/or be removed prior to the nozzle. Non-limiting examples of purge fluids include gases such as air, carbon dioxide, nitrogen, argon, or the like, and/or liquids such as water (which may be pure, contain one or more additives such as surfactants in some cases, etc.). Purge fluids could also be a non-reactive paste such as petroleum jelly or a viscous silicone oil or paraffin wax, or an aqueous or alcohol based gel such as pluronic or carbopol. Combinations of purge fluids may also be used in some embodiments.

As a non-limiting example of use of a purge fluid, a nozzle may have a first inlet and a second inlet, in which two fluids (A and B) are reacted together to produce a first product. The nozzle may also be used to produce a second product also formed from two fluids (A' and B'), where one or both of A' and B' are different than A and B. Both A and A' may be introduced using the first inlet, while B and B' may be introduced using the second inlet. To avoid contamination of A with A' and/or B with B', one or more purge fluids may be introduced between introducing A and A' to the nozzle and/or B and B' to the nozzle. In some cases, sufficient purge fluid may be introduced to clear the entire nozzle or mixing chamber between different fluids, although in other cases, some degree of contamination may be deemed to be acceptable, e.g., the purge fluid may be used to reduce but not completely eliminate contamination. The introduction of more than one fluid into an inlet may be controlled using any suitable technique; e.g., one or more fluid sources may be able to be placed in fluid communication with an inlet, where control of such fluid communication may be controlled using one or more valves (e.g., needle valves or other valves such as those discussed herein), which in some cases may be controlled using a computer or other controller.

Figures 2, 3:
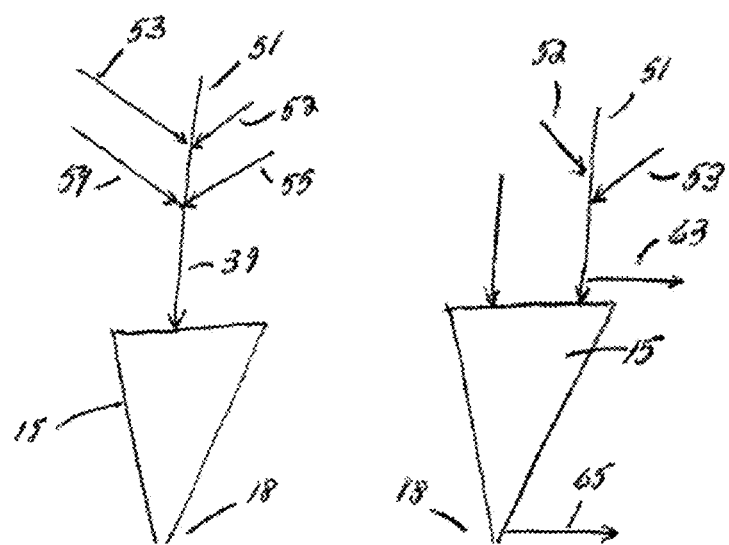
FIG. 2 illustrates a system comprising a single input, in accordance with another embodiment of the invention.
FIG. 3 illustrates an input comprising a purge system, in still another embodiment of the invention.

As a non-limiting example, FIG. 2 illustrates the use of a nozzle or mixing chamber with only one input. In this figure, nozzle 15 includes an outlet 18 and a single input 39. However, in fluidic communication with input 39 are a plurality of different sources of fluid 51, 52, 53, 54, and 55. (Five sources are provided here by way of example only, but more or fewer sources may be used in other embodiments.) In this figure, source 51 may be, for example, a purge fluid, while sources 52, 53, 54, and 55 may be sources of various fluids or reactants to be introduced into nozzle 15. As a non-limiting example, different combinations of reactants may be introduced into the nozzle from the different sources of fluid, while purge fluid from source 51 may be used to purge inlet 39 between different fluids, e.g., to reduce contamination.

FIG. 3 illustrates a system in which a purge fluid may be withdrawn at various locations. In this figure, nozzle 15 includes an inlet 31 in fluid communication with a source of purge fluid 51 and a sources of other fluids 52 and 53. (Two are shown here for explanatory purposes, but more or fewer sources may be used in other embodiments.) Also shown in this figure are outlets 63 and 65, in addition to outlet 18 of the nozzle. The flow of fluid may be controlled by one or more valves or other apparatuses, e.g., controlled by a computer or other controller. Thus, in this example, a purge fluid may be introduced from fluid source 51 and controllably withdrawn using outlet 63 (i.e., without entering nozzle 15), outlet 65 (i.e., passing through nozzle 15 but not outlet 18), or outlet 18. Other purge configurations are also possible in other embodiments.

In some embodiments, additives are introduced into the mixture. They may be introduced at any suitable point, for example, directly into a nozzle or mixing chamber (e.g., through one or more separate inlets), or upstream of the nozzle or mixing chamber (e.g., using a series of mixing chambers, as described herein). In some embodiments, an additive may be added directly to another fluid (e.g., without necessarily requiring a mixing chamber). These additives can comprise particles such as reinforcing particles (e.g., as described herein), hollow glass spheres, hollow elastomer spheres (e.g., hollow polyurethane spheres), hollow glass spheres, a pigment, a metal, a filler such as a thermally conductive filler, a filler having a relative dielectric constant of at least 5, an ultraviolet stabilizer, a filler concentrate, or another suitable additive. Additional examples of additives include surfactants (e.g., silicone surfactants), catalysts, nucleation promotors, fillers for better abrasion resistance, chemical foaming agents, etc. Combinations of these and/or other additives are also possible. As a non-limiting example, a 3D printed closed-cell foam may be produced that incorporates particulate additives comprising a cellular network of cell walls separating empty cells, where the cell walls comprise a polymer composite including filler particles dispersed in a polymer matrix.

As a non-limiting example, hollow glass spheres or hollow elastomer spheres (e.g., hollow polyurethane spheres) may be incorporated into polyurethanes or other polymers as discussed herein to reduce density, increase stiffness, reduce dielectric constant, provide more nucleation sites for bubble formation, or the like. For instance, hollow spheres may be used to decrease weight. Hollow spheres, for example hollow glass spheres or hollow polymer spheres can be varied, e.g., spatially, in order to change the properties of the product. In some embodiments, hollow polymer spheres may be used instead of or in addition to hollow glass spheres. Other examples of particles (e.g., reinforcing particles) that can be used, e.g., in addition to and/or instead of hollow glass spheres include, but are not limited to, rubber particles and other particles described herein.

In one set of embodiments, one or more methods for manufacturing 3D-printed articles as described herein may be advantageous in comparison to other methods for making articles for use in footwear. For example, a footwear manufacturer employing a method as described herein may be able to use fewer processes to create the article than would be employed in other comparable processes (e.g., the manufacturer may use a three-dimensional printer (3D printer) in a single process to make a component that would otherwise be made by a combination of several processes such as injection molding, lamination, and the like). This may facilitate more rapid and/or more facile manufacturing. As another example, one or more of the methods described herein may not necessarily require the use equipment that is expensive to manufacture and whose cost is typically recovered only after repeated use (e.g., molds). Some of the methods described herein may instead employ a 3D printer to create articles whose design can be modified as desired with little or no added cost. In some embodiments, it may be economical for methods as described herein to create small batches of 3D-printed articles (e.g., batches of less than 100, less than 50, or less than 10). It is thus possible for manufacturers may employ some of the methods described herein to respond to changing market conditions, to create articles for use in footwear that are designed for individual users or groups of users, etc. In some embodiments, it may be advantageous to use one or more of the methods described herein to fabricate a 3D-printed article at the point of sale and/or to avoid long distance shipping. Other examples may be seen in U.S. Pat. Apl. Ser. No. 62/464,364, entitled "Systems and Methods for Three-Dimensional Printing of Footwear and Other Articles," filed Feb. 27, 2017, incorporated herein by reference in its entirety.

Figure 13:
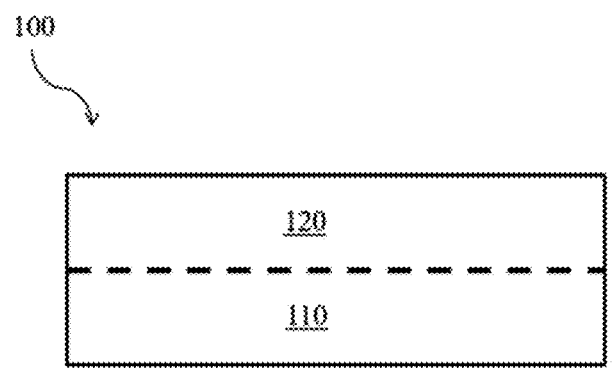
FIG. 13 illustrates a 3D-printed article according to certain embodiments of the invention.

A non-limiting example of a 3D-printed article for use in footwear is shown in FIG. 13. In this figure, 3D-printed article 100 comprises first portion 110 and second portion 120. As used herein, a portion of an article may refer to any collection of points within the article (i.e., points that are within the portion of space bounded by the external surfaces of the article). Portions of the article are typically, but not always, volumes of space within the article (in some embodiments, a portion may be a surface within an article, a line within an article, or a point within an article). Portions of the article may be continuous (i.e., each point within the portion may be connected by a pathway that does not pass through any points external to the portion) or may be discontinuous (i.e., the portion may comprise at least one point that cannot be connected to at least one other point within the article by a pathway that does not pass through any points external to the portion). Portions of an article may be substantially homogeneous with respect to one or more properties (e.g., one or more properties of the portion may vary with a standard deviation of less than or equal to 1%, 2%, 5%, or 10% throughout the portion), and/or may be heterogeneous with respect to one or more properties (e.g., one or more properties of the portion may vary with a standard deviation of greater than or equal to 1%, 2%, 5%, or 10% throughout the portion).

In some embodiments, a 3D-printed article may comprise two or more portions, where one or more properties (e.g., average pore size, density, stiffness, stiffness of solid components of the article, Shore A hardness, degree of cross-linking, chemical composition, color, abrasion resistance, thermal conductivity, electrical conductivity, stiffness anisotropy, elastic modulus, flexural modulus, filler content, opacity, conductivity, breathability) of a first portion may differ from one or more properties of a second portion. In some embodiments, the difference in properties between the first portion and the second portion may comprise a gradient of the one or more properties (e.g., the property or properties may vary relatively smoothly from a first value in the first portion to a second value in the second portion). In other embodiments, there may be a sharp change in one or more of the properties at a boundary of one or more of the first portion and the second portion. Other examples include, but are not limited to, average largest dimension of particles (e.g., reinforcing particles), average concentration of particles (e.g., reinforcing particles), surface roughness, compression strength, slip resistance, or abrasion resistance.

It should be understood that while FIG. 13 shows the second portion positioned above the first portion, other arrangements of the first portion with respect to the second portion are also contemplated. For example, the first portion may be positioned beside the second portion, the first portion may surround the second portion, the first portion and the second portion may interpenetrate (e.g., a first portion may comprise a foam that interpenetrates with a second portion that comprises an elastomer), etc. It should also be noted that while FIG. 13 shows the second portion directly adjacent the first portion, this configuration should not be understood to be limiting. In some embodiments, the first portion may be separated from the second portion by one or more intervening portions positioned between the first portion and the second portion. As used herein, a portion that is positioned "between" two portions may be directly between the two portions such that no intervening portion is present, or an intervening portion may be present.

Similarly, while FIG. 13 only depicts two portions, it should also be understood that an article may comprise three portions, four portions, or more portions. In some embodiments, portions within a 3D-printed article as described herein may also further comprise sub-portions. Each portion and/or sub-portion may differ from each other (sub-)portion in at least one way (e.g., any two (sub-)portions may comprise at least one property that is different), or one or more (sub-)portions may be substantially similar to other (sub-)portion(s) of the 3D-printed article.

In some embodiments, a first portion and a second portion as described herein may be components of a 3D-printed article that is a single integrated material. As used herein, two or more portions that together form a single integrated material are not separated by a separable interface. In some embodiments, a single integrated material may not separate into discrete parts during the course of normal use, and/or may be separated into discrete parts whose morphologies would not be predictable prior to normal use and/or along interfaces that would not be predictable prior to normal use. For instance, a single integrated material may lack seams, lack an adhesive that bonds two or more portions together, and/or lack an interface at which one or more properties (e.g., average pore size, density, stiffness, stiffness of solid components of the article, Shore A hardness, degree of cross-linking, chemical composition, color, abrasion resistance, thermal conductivity, electrical conductivity, stiffness anisotropy, elastic modulus, flexural modulus, filler content, opacity, conductivity, breathability) undergo step changes.

In some embodiments, one or more portions may together form an 3D-printed article with one or more of the following features: macrovoids embedded within the article (e.g., a midsole) without an intersecting interface from overmolding, lamination, or ultrasonic welding; one or more open cell lattices; variations in density across geometries that would be challenging to form by molding; interpenetrating foams and elastomers that may, in some embodiments, not be separated by an interface due to molding or lamination; and/or one or more interfaces between different materials with extreme undercuts (e.g., materials with a negative draft angle, materials which cannot be injection molded using a single mold because they would be unable to slide out of the mold). In some embodiments, a 3D printed article may comprise a multi-layered lattice structure with high elastic rebound. The lattice structure may be open cell or closed cell, or may have regions with both open cells and closed cells. In some embodiments, the 3D printed lattice structure may serve as a component of a footwear upper. In some embodiments, the lattice structure may comprise an element of a footwear bottom unit (e.g., midsole, outsole, insole, or sockliner). In some embodiments, the lattice structure may be printed separately and be inserted, fit, or glued into another element that is not 3D printed. In some embodiments, the lattice structure may be formed from a thermoplastic (e.g., a thermoplastic polyurethane). In other embodiments, the lattice structure may be formed from a thermoset, e.g., a polyurethane, a polyurea, or a combination of the two. Other compositions are also possible. In some embodiments, any of the aforementioned 3D printed lattice structures may have a gradient in one or more material properties throughout the structure. In some embodiments, the lattice structure and/or density may change throughout the structure.

It should also be understood that certain 3D-printed articles described herein may not be foams (i.e., they may not include any pores). For instance, certain embodiments may relate to 3D-printed articles that are not foams and that comprise one or more elastomers. In addition, in some cases, an article may be printed that can then be formed into a foam, e.g., using a chemical reaction to produce a gas within the article.

Figure 14:
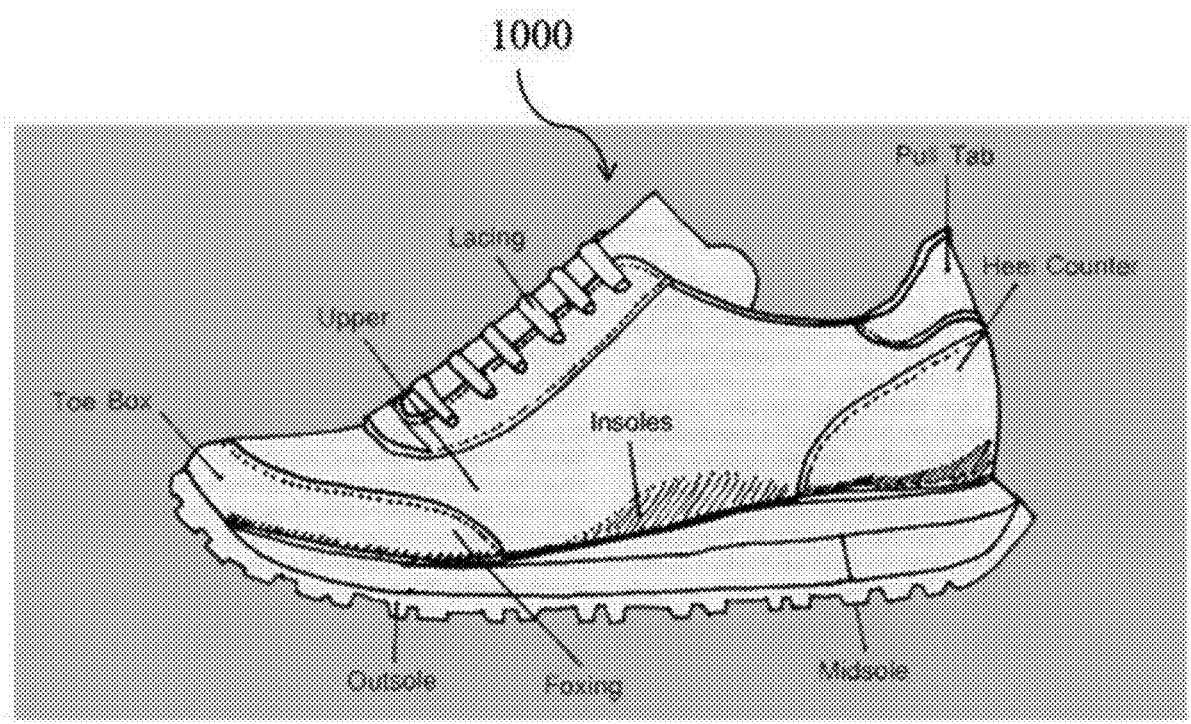
FIG. 14 illustrates an article of footwear according to certain embodiments of the invention.

In some embodiments, a 3D-printed article as designed herein may be suitable for use as a component of one or more articles of footwear. FIG. 14 shows one non-limiting embodiment of an article of footwear 1000. The article of footwear comprises a sole, a toe box, an upper; lacing, a heel counter, and a pull tab. It should be understood that 3D-printed articles suitable for use in footwear may form any of the components or be a portion of any or all of the components shown in FIG. 14. In some embodiments, multiple 3D-printed articles may be positioned on a single article of footwear (e.g., a single article of footwear may comprise a 3D-printed article that is disposed on a sole or is a sole and a 3D-printed article that is disposed on an upper). In some embodiments, the 3D-printed article may be a sole or a sole component, such as an outsole, a midsole, or an insole. In some embodiments, the 3D-printed article may be an article that is printed onto a sole component, such as a midsole and/or insole that is printed onto an outsole (e.g., a commercially available outsole, an outsole produced by a non-3D printing process). In some embodiments, the 3D-printed article may be an article that is printed onto an upper, such as a toe box, a heel counter, an ankle support, and/or a pull tab. The upper may be one component of a fully assembled shoe which lacks the part(s) to be printed, or it may be an upper that has not been assembled with other footwear components. In some embodiments, a 3D-printed article may be a combination of two or more footwear components that are typically provided as separate articles. For example, the 3D-printed article may be able to serve as both a midsole and an insole, or may comprise a midsole and an insole that are a single integrated material. As another example, the 3D-printed article may be able to serve as both an outsole and an insole, or may comprise an outsole and an insole that are a single integrated material. In some embodiments, a 3D-printed article comprising two or more footwear components (e.g., a 3D-printed article comprising a midsole and an insole, a 3D-printed article comprising an outsole and an insole) may be printed using a single integrated process. Although FIG. 14 shows an athletic shoe, 3D-printed articles suitable for use in other types of footwear are also contemplated as described in further detail below. In some embodiments, the 3D-printed article may also or instead be suitable for one or more non-footwear components, such as orthotics and/or prosthetics.

As described above, certain articles as described herein may be formed by a process involving one or more 3D-printing steps. In some embodiments, an article may be formed by a process involving both one or more 3D-printing steps and one or more non-3D-printing steps. For example, an article may be formed by a first 3D-printing step followed by a first non-3D-printing step which is optionally followed by one or more further 3D-printing steps or non-3D-printing steps. For example, a sole or sole component may be 3D-printed into a mold to form a first portion and then a material may be injection molded or compression molded above the first portion to form the second portion. Third, fourth, fifth, and/or higher numbered portions may then optionally be formed on the second portion (by, e.g., 3D-printing). As another example, a non-3D printing step may comprise directly bonding two materials by pressing a first material (e.g., a non-3D-printed material, an upper) into a second 3D-printed material (e.g., a 3D-printed midsole) prior to full curing of the second material. As a third example, an inkjet finishing process may be applied to deposit one or more materials (e.g., one more pigments) on a 3D-printed article or on a material disposed on a 3D-printed article (e.g., a material injection molded or compression molded on a 3D-printed article). In some embodiments, an inkjet finishing process may enhance the surface quality of the article that is subject to it. As a non-limiting example, a thermoplastic material may be three-dimensionally printed onto a substrate, and then subsequently be at least partially over printed with at least one layer of inkjet ink in at least one color to create a color, texture, or image on the three-dimensionally printed part. An optional third step may involve coating the at least one inkjet layer with another layer or polymer to protect the inkjet layer from abrasion, or to enhance the appearance. This third layer may be extruded, sprayed, or jetted. One of ordinary skill in the art would also understand that the third layer may also be deposited through any other deposition process. The substrate may be a textile, or could also be an article of apparel, or a component of a footwear upper. The substrate may have a substantially similar composition to the three-dimensionally printed polymer or polymers (e.g., both the substrate and the printed material may be thermoplastic polyurethanes). The three-dimensionally printed article that receives the ink-jet layer may have a gradient in a property (e.g., a gradient in tensile elastic modulus). The three-dimensionally printed part may also be a composite containing particles or other fillers. It should be noted that the inkjet layer may not coat the entire three-dimensionally printed part, and may also coat other parts of the substrate. The three-dimensionally printed part may be any color, but may also be at least partially transparent to light in the visible spectrum, so as to facilitate the inkjet coloration to be seen through a layer of the printed polymeric material. In another non-limiting example, a substrate may first be at least partially coated by one or more ink-jet layers. Those inkjet layers may be subsequently at least partially coated by three-dimensionally printed polymer or polymers.

In some non-limiting embodiments, it may be advantageous to coat at least some portion of a substrate with a polymeric coating prior to depositing one or more layers of polymer from the microfluidic printing nozzle. In some cases, the coating on the substrate may be used to enhance the adhesion of the polymer to the substrate. In other cases, the coating may be used to limit the adhesion of the polymer to the substrate. In some cases, the coating may be deposited by a spray process. In some cases, the coating may be deposited by inkjet. In other cases, the coating may be deposited by dip coating, or any other industrial coating process. The coating may be applied to the whole substrate, or may be selectively applied to some areas of the substrate. The coating could comprise or be a polymer dispersion, a polymer emulsion, a polymer suspension, or a polymer solution. The carrier fluid could comprise or be water, a solvent, or a mixture of any of these. In cases where the coating contains water or a solvent, it may be advantageous to dry the coating either fully or partially prior to printing onto it. In some cases, the coating could also comprise or be a monomer or oligomer, that is further polymerized after deposition onto the substrate. In some cases, the coating may be exposed to heat or UV light to cure or dry the coating before printing on top of it. In some cases, where the coating is intended to increase the adhesion of a thermoplastic to the substrate, it may be advantageous for the coating to have a substantially similar composition compared to the polymer that will subsequently be printed on top. In one non-limiting example, the coating may comprise or be a water-based thermoplastic polyurethane dispersion, and the polymer mixture that is printed onto the coating may comprise or be a melted thermoplastic polyurethane. In cases where the coating and the printed material are both thermoplastics, it may be advantageous to select a coating material with a melting point that is lower than the melting point of the polymer or polymer blend that will be printed onto the subsequent layer. For example, a thermoplastic polyurethane coating that melts at 170 degrees Celsius may be selected as a coating for a printed polymer blend that melts at 190 degrees Celsius. In this case, the coating may substantially penetrate the substrate to create mechanical interlocking, and the printed material may be melt fused to the coating layer. In cases where the coating is intended to reduce the adhesion to the substrate, the coating may be selected to have a low surface energy. As a non-limiting example, a coating intended to limit adhesion may contain a polymer like polytetrafluoroethylene, which is known to bond poorly to thermoplastics. In another example, the coating may comprise or be a silicone. In some cases, two or more different types of coatings may be applied to the substrate. In some cases, each coating may be selectively applied. In some cases, one coating that increases adhesion may be applied in areas where adhesion of the printed material is desired, and another coating that reduces adhesion may be applied in areas where reduced adhesion is desired. This strategy may facilitate some parts of the print to be separated from the substrate after printing, while other regions remain adhered. In some cases, the coating may be selected to be soluble in a particular solvent, e.g., water. This solubility may be used to separate the printed part from the coating, and facilitate removal or recycling. In some cases, one or more of the printed polymers may be soluble in a solvent, e.g., water, such that one of the inputs can be used as a soluble support material, or so that voids can be created in the printed part by dissolving regions of it.

In some embodiments, one or more properties of a mixture that is 3D-printed from a nozzle may change as a function of time and/or nozzle position with respect to the substrate. For instance, the composition of one or more components and/or the wt % of one or more components within the mixture may change as a function of time. In some embodiments, one or more physical parameters of the nozzle and/or the substrate may change as a function of time. As an example, the temperature of the nozzle and/or the substrate may change as a function of time. Without wishing to be bound by theory, the temperature of the nozzle and the temperature of the substrate may affect the types of reactions that occur between various components (e.g., cross-linking reactions, foaming reactions, reactions within the nozzle, reactions on the substrate) and/or the rates at which these reactions occur. This may in turn affect the chemical structure of the mixture (e.g., the composition of the mixture, the degree of cross-linking of the resultant foam) during and/or after printing, and/or affect one or more physical properties of the mixture (e.g., the viscosity of the mixture, the average pore size of the resultant foam, the density of the resultant foam, the stiffness of the resultant foam, the Shore A hardness of the resultant foam) during and/or after printing. In some embodiments, changes in substrate or nozzle temperature during printing may facilitate different portions of the 3D-printed article (e.g., those printed at different times and/or in different positions on the substrate) to have different chemical or physical properties. In some embodiments, the portions with different chemical and/or physical properties may be printed in a single continuous process, and/or may together form a single integrated material.

U.S. Pat. Apl. Ser. Nos. 62/464,363 and 62/464,364 are each incorporated herein by reference in its entirety.

The Inventors recognized the problem that some particles (e.g., fumed silica), which can be used to change the rheology and/or mechanical properties of a material (e.g., a polymeric material), are difficult to use in spraying methods for deposition of material. The degree of particle incorporation may be useful, for example, in controlling whether a material deposited onto a fabric sits on top of the fabric (e.g., material with a sufficient volume percent of the particles) or seeps into the fabric. In addition, the Inventors have determined that combining a microfluidic printing nozzle (e.g., having a mixing chamber and an impeller disposed in the mixing chamber) configured to actively mix small volumes of material with a compressed gas source, an outlet of which printing nozzle intersects with an outlet in fluid communication with the compressed gas source, a print head with spraying capabilities results in which input ratios (e.g., volume ratios) into the printing nozzle, and therefore material composition of the sprayed material, can be changed on the fly.

In some embodiments, it can be useful deposit material onto surfaces by spraying rather than by extrusion alone through a nozzle. Advantages of spraying relative to extrusion alone may include but are not limited to deposition of thinner films with no extrusion lines; reduced sensitivity to nozzle standoff distance from the substrate; and/or a capacity to create wider strips of material in one pass to reduce cycle time. Other advantages of spraying relative to extrusion alone may include limited accumulation or no accumulation of cured material on the nozzle, which may be because spraying may not require the spray nozzle to come into direct fluid communication with material that has already been deposited. In addition, coatings made by spraying can be applied conformally to three-dimensional (3D) surfaces without precise alignment or 3D tool-pathing.

In some embodiments, it is possible to make slight modifications to a mixing nozzle (e.g., a 4-input dynamic mixing nozzle) to convert it into a spray nozzle. In order to do this, a compressed gas guiding sheath fluidly connected with a compressed gas source may be attached around the outside of the nozzle. In some embodiments, a configuration of an impeller disposed in the mixing chamber of the mixing nozzle ensures that a small mixing volume is retained such that rapid changes in the sprayed material composition can be executed. In some embodiments, the compressed gas guiding sheath (e.g., air guiding sheath) is configured to guide the flow of compressed gas from a compressed gas source to atomize the output of the nozzle into small droplets immediately upon exiting the nozzle. In some embodiments, the small droplets are then propelled through the air to land on a target substrate. In some embodiments, ratio(s) (e.g., volume ratios) of the inputs (e.g., 4 inputs) into the mixing chamber can be changed in space and time to vary the composition of the material that is sprayed. In some embodiments, the geometry of the compressed gas guiding sheath and/or the applied pressure from the compressed gas can be used to change the shape and velocity of the cone of atomized material that is deposited. In some embodiments, the standoff distance from the substrate can be used to control the width of the sprayed strips.

In any variation of the nozzle (e.g., mixing nozzle), the nozzle may have one input or two inputs or more than two inputs (e.g., 3, 4, 5, 6, 7, 8, 9, 10, or more inputs).

In some embodiments, a print head is provided.

Figure 16:
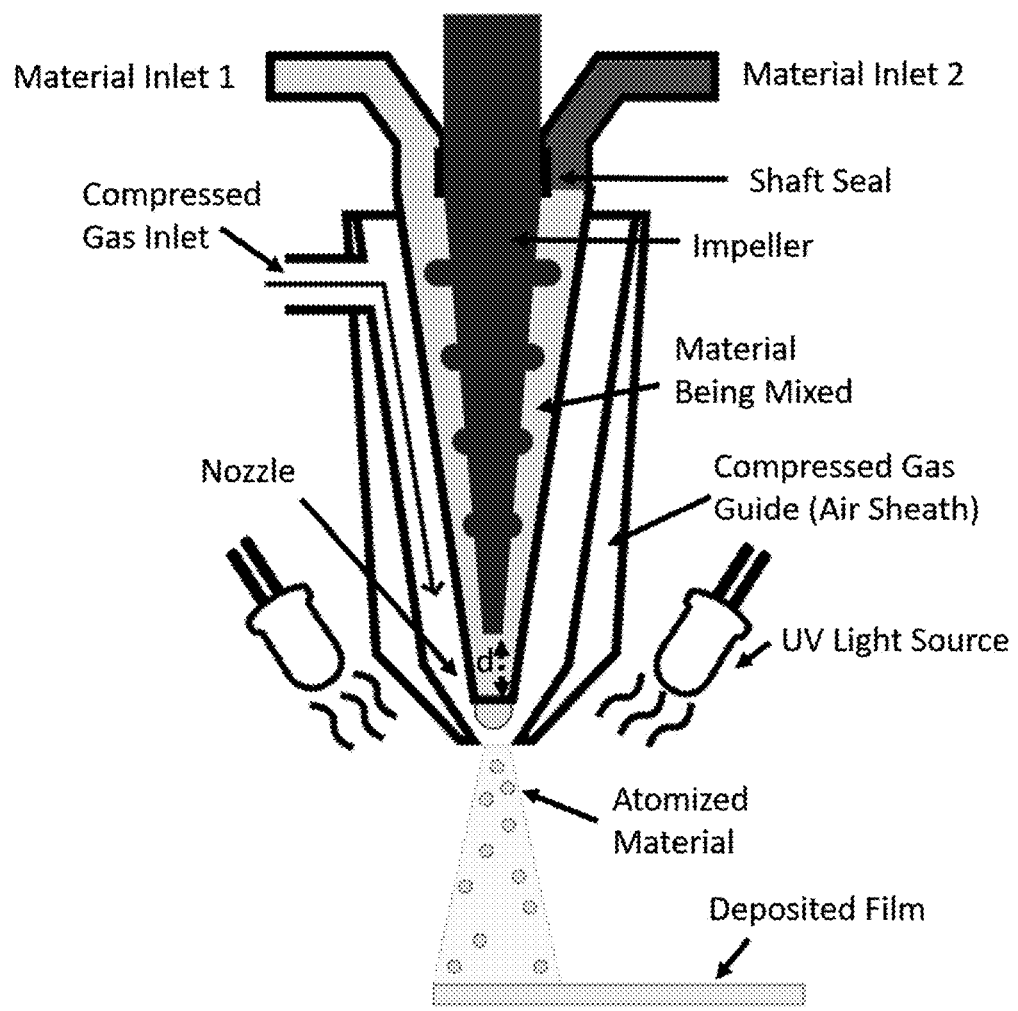
FIG. 16 is a schematic of an illustrative reactive spray print head with an integrated UV curing mechanism, in accordance with some embodiments.

The print head can have a printing nozzle, which can have a mixing chamber, an impeller disposed in the mixing chamber, and two or more material inlets in fluid communication with the mixing chamber (see, e.g., FIG. 16). In some embodiments, a tip of the impeller is less than 5 mm from an outlet of the printing nozzle. In some embodiments, an outlet of the printing nozzle (e.g., of the mixing chamber) is configured to intersect with an outlet fluidly connected to the compressed gas source (see, e.g., FIG. 16). In some embodiments, a volume of the mixing chamber is less than 1 mL. In some embodiments, the volume of the mixing chamber is less than 250 microliters. In some embodiments, the mixing chamber is in fluid communication with three or more material inlets. In some embodiments, the mixing chamber is in fluid communication with four or more material inlets. In some embodiments, one or more of the material inlets is in fluid communication with a respective in-line rotary pump.

The print head can have a compressed gas source (see, e.g., FIG. 16). In some embodiments, the compressed gas source is configured to atomize a material extruded from the printing nozzle (e.g., from the mixing chamber). In some embodiments, the compressed gas source is in fluid communication with an electropneumatic regulator.

In some embodiments, the print head has a compressed gas guiding sheath fluidly connected to the compressed gas source (see, e.g., FIG. 16). In some embodiments, an outlet of the mixing chamber is configured to intersect with an outlet of the compressed gas guiding sheath. In some embodiments, the compressed gas guiding sheath is a microfluidic gas guiding sheath. In some embodiments, the compressed gas guiding sheath (e.g., microfluidic gas guiding sheath) is actuatable such the sheath can be moved with respect to an outlet of the printing nozzle or vice versa. In some embodiments, the compressed gas guiding sheath (e.g., microfluidic gas guiding sheath) is coupled to the print head through magnetic attachment such that it can be easily removed. In some embodiments, the compressed gas guiding sheath (e.g., microfluidic gas guiding sheath) has multiple gas channels coupled to valves that can be addressed individually. In some embodiments, moving the sheath with respect to the outlet of the printing nozzle changes channels through which compressed gas is configured to flow, which changes the shape of an atomized material cone that is deposited onto the surface from the outlet of the printing nozzle.

In some embodiments, the formulation comprises two or more parts, and passing a formulation through the print head involves flowing at least two of the two or more parts of the formulation through a respective material inlet of the two or more material inlets into the printing nozzle. In some embodiments, the formulation comprises three or more parts, and passing a formulation through the print head involves flowing at least three of the three or more parts of the formulation through a respective material inlet of three or more material inlets into the printing nozzle. In some embodiments, the formulation comprises four or more parts, and passing a formulation through the print head involves flowing at least four of the four or more parts of the formulation through a respective material inlet of four or more material inlets into the printing nozzle.

In some embodiments, a print head comprising a microfluidic printing nozzle is provided. FIG. 17 shows a non-limiting illustrative example of one such print head comprising a microfluidic printing nozzle and two inputs to the microfluidic printing nozzle fed by polymer pellet feeders. In some embodiments, each rotary positive displacement pump has an individually controllable heater and melting zone for melting the solid polymer pellets. In some embodiments, the flow rate of each rotary positive displacement pump is each individually controlled by dosing motors. These motors may be electronically controllable by means of a controller. Fluids may be pumped through melted polymer flow channels to a mixing chamber, and the mixing chamber may have an impeller disposed in the mixing chamber. The impeller may be rotatable by means of a mixing motor to mix the fluid polymeric materials. The mixing chamber may also be heated to a temperature. The temperature may be the same as a temperature of either of the melting zones, or the temperature could be different from the temperatures of the melting zones. The temperature may range from 20 degrees Celsius to temperatures as high as 400 degrees Celsius, inclusive. The print head comprising the microfluidic printing nozzle may print parts with gradients in one or more material properties, but may also be used to print parts of a single composition without a gradient in a property. The composition of any part of a print may include only one input, or may include a combination of both inputs.

FIG. 17 is a schematic diagram of a non-limiting illustrative print head, in accordance with some embodiments. The print head of FIG. 17 is a multi-input print head for three-dimensionally printing. The print head 2202 of FIG. 17 is delineated in FIG. 18. Print head 2202 comprises a microfluidic printing nozzle 2204, delineated in FIG. 18. Microfluidic printing nozzle 2204 comprises an orifice 2206 configured to extrude material. Microfluidic printing nozzle 2204 further comprises a mixing chamber 2208, in fluid communication with orifice 2206, with an impeller 2210 disposed therein configured to mix the material, wherein mixing chamber 2208 is in thermal communication with a heating device 2212, a cooling device 2214, and—in certain embodiments—at least one temperature measuring device.

In some embodiments, at least one heating device is configured to heat at least one (e.g., each) rotary positive displacement pump, e.g., in order to melt a polymeric material (e.g., in pellet form) as it is moved through the pump. In some embodiments, at least one heating device is configured to heat the mixing chamber, e.g., such that liquid polymeric material(s) that enter the mixing chamber remain in liquid form during mixing and extrusion through the orifice of the microfluidic printing nozzle. In some embodiments, at least one heating device is configured to heat the mixing chamber and/or at least one (e.g., each) rotary positive displacement pump to a temperature greater than or equal to 100 degrees Celsius, greater than or equal to 110 degrees Celsius, greater than or equal to 120 degrees Celsius, greater than or equal to 130 degrees Celsius, greater than or equal to 140 degrees Celsius, greater than or equal to 150 degrees Celsius, greater than or equal to 160 degrees Celsius, greater than or equal to 170 degrees Celsius, greater than or equal to 190 degrees Celsius, or greater than or equal to 210 degrees Celsius. In some embodiments, at least one heating device is configured to heat the mixing chamber and/or at least one (e.g., each) rotary positive displacement pump to a temperature less than or equal to 300 degrees Celsius, less than or equal to 280 degrees Celsius, less than or equal to 260 degrees Celsius, less than or equal to 240 degrees Celsius, less than or equal to 230 degrees Celsius, less than or equal to 220 degrees Celsius, less than or equal to 200 degrees Celsius, or less than or equal to 180 degrees Celsius. Combinations of the above-referenced ranges are also possible (e.g., greater than or equal to 100 degrees Celsius and less than or equal to 300 degrees Celsius, greater than or equal to 100 degrees Celsius and less than or equal to 180 degrees Celsius, greater than or equal to 210 degrees Celsius and less than or equal to 300 degrees Celsius). Other ranges are also possible. In some embodiments, at least one heating device is configured to heat the mixing chamber to greater than or equal to 190 degrees Celsius and less than or equal to 230 degrees Celsius. In some embodiments, at least one heating device is configured to heat the mixing chamber to greater than or equal to 200 degrees Celsius and less than or equal to 220 degrees Celsius. In certain embodiments, at least one heating device is configured to heat the mixing chamber to 210 degrees Celsius.

Print head 2202 further comprises a first input comprising a first rotary positive displacement pump 2216 in fluid communication with mixing chamber 2208 of microfluidic printing nozzle 2204. Print head 2202 further comprises a second input comprising a second rotary positive displacement pump 2218 in fluid communication with mixing chamber 2208. Print head 2202 further comprises a motor 2220 mechanically connected to impeller 2210. In certain embodiments, motor 2220 is configured to rotate impeller 2210 at a rate of greater than 300 rotations per minute (RPM). In some embodiments, print head 2202 comprises a shaft seal 2242 (e.g., comprising a metal, graphite, graphene, and/or carbon nanotubes) to prevent backflow of the material in the mixing chamber. In certain embodiments, the heating device 2212 in thermal communication with mixing chamber 2208 is configured to heat mixing chamber 2208 to a temperature greater than 100 degrees Celsius.

First rotary positive displacement pump 2216 and second rotary positive displacement pump 2218 each have an individually controllable heating device 2212 and first melting zone 2222 and second melting zone 2224 configured for melting first solid polymer pellets 2226 and second solid polymer pellets 2228. In some embodiments, first solid polymer pellets 2226 are fed into print head 2202 through a pellet feed inlet 2240, and similarly for second solid polymer pellets 2228. In some embodiments, the flow rate of first rotary positive displacement pump 2216 and second rotary positive displacement pump 2218 is each individually controlled by first dosing motor 2230 and second dosing motor 2232, respectively. First dosing motor 2230 and second dosing motor 2232 may be electronically controllable by means of a controller.

In certain embodiments, a method for printing a three-dimensional polymeric part (e.g., thermoplastic part), using print head 2202 having microfluidic printing nozzle 2204 may be carried out. In certain embodiments, the method comprises heating, to a temperature greater than 100 degrees Celsius, by use of the heating device 2212 in thermal communication with mixing chamber 2208, mixing chamber 2208 of microfluidic printing nozzle 2204. In certain embodiments, the method comprises pumping, into mixing chamber 2208, by way of first melted polymer flow channel 2234 and second melted polymer flow channel 2236, a first fluid polymeric material and a second fluid polymeric material respectively, through a first inlet and a second inlet respectively, by use of first rotary positive displacement pump 2216 and second rotary positive displacement pump 2218 respectively. In certain embodiments, the method comprises actively mixing at least the first fluid polymeric material and the second fluid polymeric material using impeller 2210 in mixing chamber 2208. In certain embodiments, the method comprises extruding the mixture of at least the first fluid polymeric material and the second fluid polymeric material through orifice 2206 onto a substrate. Combinations of these method steps are also possible. Print head 2202 is shown having printed a part 2238 having a gradient in one or more material properties.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When the word "about" is used herein in reference to a number, it should be understood that still another embodiment of the invention includes that number not modified by the presence of the word "about."

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method for printing a three-dimensional thermoplastic part, using a print head having a microfluidic printing nozzle, the method comprising:
    heating to a temperature greater than 100 degrees Celsius, by use of at least one heating device, a mixing chamber of the microfluidic printing nozzle;

pumping, into the mixing chamber, at least a first fluid polymeric material and a second fluid polymeric material through at least a first inlet and a second inlet respectively, by use of a first pump and a second pump respectively, wherein each of the first pump and the second pump comprises a rotary positive displacement pump;

actively mixing at least the first fluid polymeric material and the second fluid polymeric material using an impeller in the mixing chamber; and extruding the mixture of at least the first fluid polymeric material and the second fluid polymeric material onto a substrate, thereby to print the three-dimensional thermoplastic part.

2. The method of claim 1, wherein the three-dimensional thermoplastic part has a gradient in one or more material properties.

3. The method of claim 1, further comprising melting at least a first polymeric material and a second polymeric material in separate melting zones of the print head to form the first fluid polymeric material and the second fluid polymeric material.

4. The method of claim 1, wherein at least the ratio of the first fluid polymeric material to the second fluid polymeric material is changed over time.

5. The method of claim 4, wherein each of at least the first fluid polymeric material and the second fluid polymeric material is in the form of a pellet or powder before it is melted.

6. The method of claim 1, wherein the print head is mounted on a robotic system by which the print head can move along at least one axis.

7. The method of claim 2, wherein each of the one or more material properties is selected from the group consisting of: stiffness, Shore A hardness, pore size, density, color, surface roughness, reflectivity, strength, elongation at break, tensile elastic modulus, modulus at 100% strain, opacity, dimensional change upon heat activation, tensile elastic modulus, shore A hardness, nanoindentation hardness, and flexural modulus.

8. The method of claim 2, wherein at least one of the one or more material properties differs by at least 10% between a first portion and a second portion of the three-dimensional thermoplastic part that is printed.

9. The method of claim 1, wherein the substrate is a textile.

10. The method of claim 9, wherein the textile is a component of a shoe.

11. The method of claim 1, wherein the three-dimensional thermoplastic part that is printed is a component of a shoe upper.

12. The method of claim 1, wherein the three-dimensional thermoplastic part that is printed is a component of an article of apparel.

13. The method of claim 1, further comprising inkjetting a pigmented inkjet ink onto at least a portion of the substrate.

14. The method of claim 1, further comprising inkjetting a pigmented inkjet ink onto at least a portion of the three-dimensional thermoplastic part that is printed.

15. The method of claim 1, wherein the three-dimensional thermoplastic part that is printed comprises, by at least 50 volume % relative to the total volume of the three-dimensional thermoplastic part, a polymer selected from the group consisting of: a thermoplastic polyurethane, a thermoplastic elastomer, a polyolefin, a polyester, a polyester terephthalate, a polyamide, a nylon, an acrylonitrile-butadiene-styrene copolymer, and a polyethylene.

16. The method of claim 1, wherein both the three-dimensional thermoplastic part that is printed and the substrate that the three-dimensional thermoplastic part is printed onto comprise, by at least 50 volume % relative to the total volume of the three-dimensional thermoplastic part or the substrate respectively, a polymer selected from the group consisting of: a thermoplastic polyurethane, a thermoplastic elastomer, a polyolefin, a polyester, a polyester terephthalate, a polyamide, a nylon, an acrylonitrile-butadiene-styrene copolymer, and a polyethylene.

17. The method of claim 4, wherein both the melting zones and the respective pumps are maintained at average temperatures that differ by greater than 5 degrees Celsius from one melting zone to another melting zone and from one pump to another pump respectively.

* * * * *